(12) United States Patent
Musolf

(10) Patent No.: US 10,578,220 B2
(45) Date of Patent: Mar. 3, 2020

(54) PROPORTIONALLY CONTROLLED PINCH VALVES, SYSTEMS AND METHODS

(71) Applicant: Bimba Manufacturing Company, University Park, IL (US)

(72) Inventor: Blaik A. Musolf, Concord, CA (US)

(73) Assignee: Bimba Manufacturing Company, University Park, IL (US)

( * ) Notice: Subject to any disclaimer, the term of this patent is extended or adjusted under 35 U.S.C. 154(b) by 0 days.

(21) Appl. No.: 15/710,174

(22) Filed: Sep. 20, 2017

(65) Prior Publication Data

US 2018/0245698 A1 Aug. 30, 2018

Related U.S. Application Data

(60) Provisional application No. 62/464,191, filed on Feb. 27, 2017.

(51) Int. Cl.
*F16K 7/04* (2006.01)
*F16K 31/122* (2006.01)
(Continued)

(52) U.S. Cl.
CPC .............. *F16K 7/045* (2013.01); *F16K 7/07* (2013.01); *F16K 31/1221* (2013.01);
(Continued)

(58) Field of Classification Search
CPC .......... F16K 7/045; F16K 7/07; F16K 37/005; F16K 37/0041; F16K 31/1221;
(Continued)

(56) References Cited

U.S. PATENT DOCUMENTS 3,612,084 A 10/1971 Kassel
3,876,121 A 4/1975 Preikschat
(Continued)

FOREIGN PATENT DOCUMENTS

CN 106053321 A 10/2016
DE 102013012158 1/2015
(Continued)

OTHER PUBLICATIONS

International Search Report and Written Opinion, counterpart International Appl. No. PCT/US2018/018938, dated Jun. 6, 2018 (16 pages).
(Continued)

*Primary Examiner* — Craig J Price
*Assistant Examiner* — Andrew J Rost
(74) *Attorney, Agent, or Firm* — Cook Alex Ltd.

(57) ABSTRACT

Precision in proportional operation of pinch valves along an application-specific path of opening and/or of closing is provided in proportionally controlled pinch valves, systems and methods. Included is the advantageous feature that pinch valves and pinch valve controlling systems and methods can be enhanced by carefully controlling not only two primary operational positions—either fully open or fully closed—but also in-between positions as are required for an application of a user of the pinch valve. The effect on the fluid flowing through tubing that is engaged by the pinch valve head between fully open and fully closed is considered, determined and used to achieve pinch valve operation that is linear in flow change and/or linear in pressure change along the closing path and/or opening path through the tubing. The pinch valves can include a normally closed port that opens when the system experiences a shut-down condition.

22 Claims, 14 Drawing Sheets

(51) Int. Cl.
*G05D 16/20* (2006.01)
*F16K 7/07* (2006.01)
*G05D 7/00* (2006.01)
*F16K 37/00* (2006.01)

(52) U.S. Cl.
CPC ........ *F16K 37/005* (2013.01); *F16K 37/0041* (2013.01); *G05D 7/005* (2013.01); *G05D 16/2022* (2019.01); *G05D 16/2097* (2019.01)

(58) Field of Classification Search
CPC ............... G05D 16/2093; G05D 7/005; G05D 16/2022; G05D 16/2097
USPC .................................. 251/7; 137/487.5, 553
See application file for complete search history.

(56) References Cited

U.S. PATENT DOCUMENTS

| | | | |
|---|---|---|---|
| 4,073,467 A | 2/1978 | Little et al. | |
| 4,491,156 A | 1/1985 | Lee, II | |
| 5,294,089 A | 3/1994 | LaMarca | |
| 5,549,793 A | 8/1996 | Hellstrom et al. | |
| 5,676,342 A | 10/1997 | Otto et al. | |
| 5,739,704 A | 4/1998 | Clark | |
| 5,918,528 A | 7/1999 | Hays | |
| 5,957,029 A | 9/1999 | Boyer et al. | |
| 6,242,909 B1 | 6/2001 | Dorsey et al. | |
| 6,279,869 B1 | 8/2001 | Olewicz | |
| 6,280,408 B1 | 8/2001 | Sipin | |
| 6,494,225 B1 | 12/2002 | Olewicz et al. | |
| 6,619,612 B2 | 9/2003 | Freisinger et al. | |
| 6,695,278 B2 | 2/2004 | Ellis | |
| 6,729,601 B2 | 5/2004 | Freisinger et al. | |
| 6,948,696 B1 | 9/2005 | Aanonsen et al. | |
| 7,104,275 B2 | 9/2006 | Dille | |
| 7,290,476 B1 | 11/2007 | Glasson | |
| 7,401,541 B2 | 7/2008 | McCarroll et al. | |
| 7,469,875 B2 | 12/2008 | Bernstein | |
| 7,715,168 B2 | 5/2010 | Gofman et al. | |
| 8,070,127 B2 | 12/2011 | Gethmann | |
| 8,087,635 B2 * | 1/2012 | Li | F16K 31/122 251/285 |
| 8,104,510 B2 | 1/2012 | Ams et al. | |
| 8,622,365 B2 | 1/2014 | Fukano et al. | |
| 8,636,180 B2 | 1/2014 | Veltrop et al. | |
| D726,874 S | 4/2015 | Wong et al. | |
| D726,875 S | 4/2015 | Wong et al. | |
| 9,022,060 B2 | 5/2015 | Blom | |
| 9,039,636 B2 | 5/2015 | Williams et al. | |
| D735,834 S | 8/2015 | Wong et al. | |
| 9,127,773 B2 | 9/2015 | Ams et al. | |
| 9,127,781 B2 | 9/2015 | Opfer et al. | |
| 9,273,278 B2 | 3/2016 | Lee et al. | |
| 9,273,791 B2 | 3/2016 | Vandamme et al. | |
| 9,334,969 B2 | 5/2016 | Berwanger et al. | |
| 9,423,047 B2 | 8/2016 | Vogt et al. | |
| 9,435,459 B2 | 9/2016 | Bedingfield | |
| 9,447,888 B2 | 9/2016 | Gagne et al. | |
| D770,018 S | 10/2016 | Musolf et al. | |
| D777,298 S | 1/2017 | Van Schijndel et al. | |
| 2004/0163711 A1 | 8/2004 | Varone et al. | |
| 2005/0186669 A1 | 8/2005 | Ho et al. | |
| 2006/0292690 A1 | 12/2006 | Liu et al. | |
| 2010/0101664 A1 | 4/2010 | Yamamoto et al. | |
| 2011/0266473 A1 | 11/2011 | Santinanavat et al. | |
| 2012/0273048 A1 | 11/2012 | Weatherbee et al. | |
| 2012/0278006 A1 | 11/2012 | Weatherbee et al. | |
| 2013/0164696 A1 | 6/2013 | Santinanavat et al. | |
| 2014/0193901 A1 | 7/2014 | Lee et al. | |
| 2015/0083949 A1 | 3/2015 | Vogt et al. | |
| 2015/0345654 A1 | 12/2015 | Carmen et al. | |
| 2016/0161004 A1 * | 6/2016 | Thompson | F16K 37/0033 251/8 |
| 2017/0030474 A1 | 2/2017 | Ben-ami | |
| 2017/0067019 A1 | 3/2017 | Ho | |

FOREIGN PATENT DOCUMENTS

| | | |
|---|---|---|
| EP | 2518575 A1 | 10/2012 |
| WO | WO2008/045835 | 4/2008 |
| WO | WO 2009/149137 A1 | 12/2009 |
| WO | WO 2012/130379 A1 | 10/2012 |
| WO | WO 2016/057981 A1 | 4/2016 |
| WO | WO 2017/041140 A1 | 3/2017 |

OTHER PUBLICATIONS

Acro Sell Sheet—Model 934 Pneumatic Pinch Valve—circa 2013, Acro Associates, Inc., Concord, California.
AKO Pinch Valves and Accessories—Low Maintenance Pinch Valves for a Variety of Applications—2016, Alb. Klein Ohio, www.akopinchvalves.com screenshot.
AKO Pinch Valves and Accessories—Pinch Valves and Their Application—2016, Alb. Klein Ohio, www.akopinchvalves.com screenshot.
AKO Pinch Valves and Accessories—Pinch Valves vs. Traditional Valves—2016, Alb. Klein Ohio, www.akopinchvalves.com screenshot.
BioReactor Sciences—PVSeries: Patented, Motor-Driven & Position-Controllable Pinch Valve—circa 2015, www.bioreactorsciences.com literature.
Bimba Manufacturing Company—SPCS-2 Servo Pneumatic Proportional Control System user manual—Jan. 23, 2014.
Bimba Manufacturing Company/ACRO—Versagrip® Solenoid Pinch Valves—Jul. 2014.
Bimba Manufacturing Company/ACRO—Products Pneumatic Pinch Valve 900 Series Models—circa 2014, acroassociates.com screenshot.
IEN Europe—Pinch M: new stepper motor pinch valves—Sell sheet, Jan. 2017.
IPU—Piezoelectric Valves—2016, www.ipu.co.il/en/piezoelectric-valves screenshot.
Kelly Pneumatics—Products—circa 2012, www.kpiwebsite.com/products screenshot.
PendoTECH—Product Information PendoTECH Throttle Valve™ sell sheet—2015.
Resolution Air A Control Valve Revolution—Proportional Pinch Valves sell sheets; www.resolutionair.com/products screenshot circa Jan. 2017—Resolution Air, Ltd., Cincinnati, Ohio.
Resolution Air A Control Valve Revolution—Miniature Proportional Pinch Valves sell sheets; www.resolutionair.com/products screenshot circa Jan. 2017—Resolution Air, Ltd., Cincinnati, Ohio.
SICK Sensor Intelligence. Position Sensors—Online Data Sheet—Nov. 23, 2016.
Sirai™ New Motorized Pinch Valves Series S170/S370—Mar. 16, 2017 downloads; screenshots www.sirai.com.

* cited by examiner

SYSTEM SET UP

FUNCTIONAL TEST

AUTOMATED CONTROL

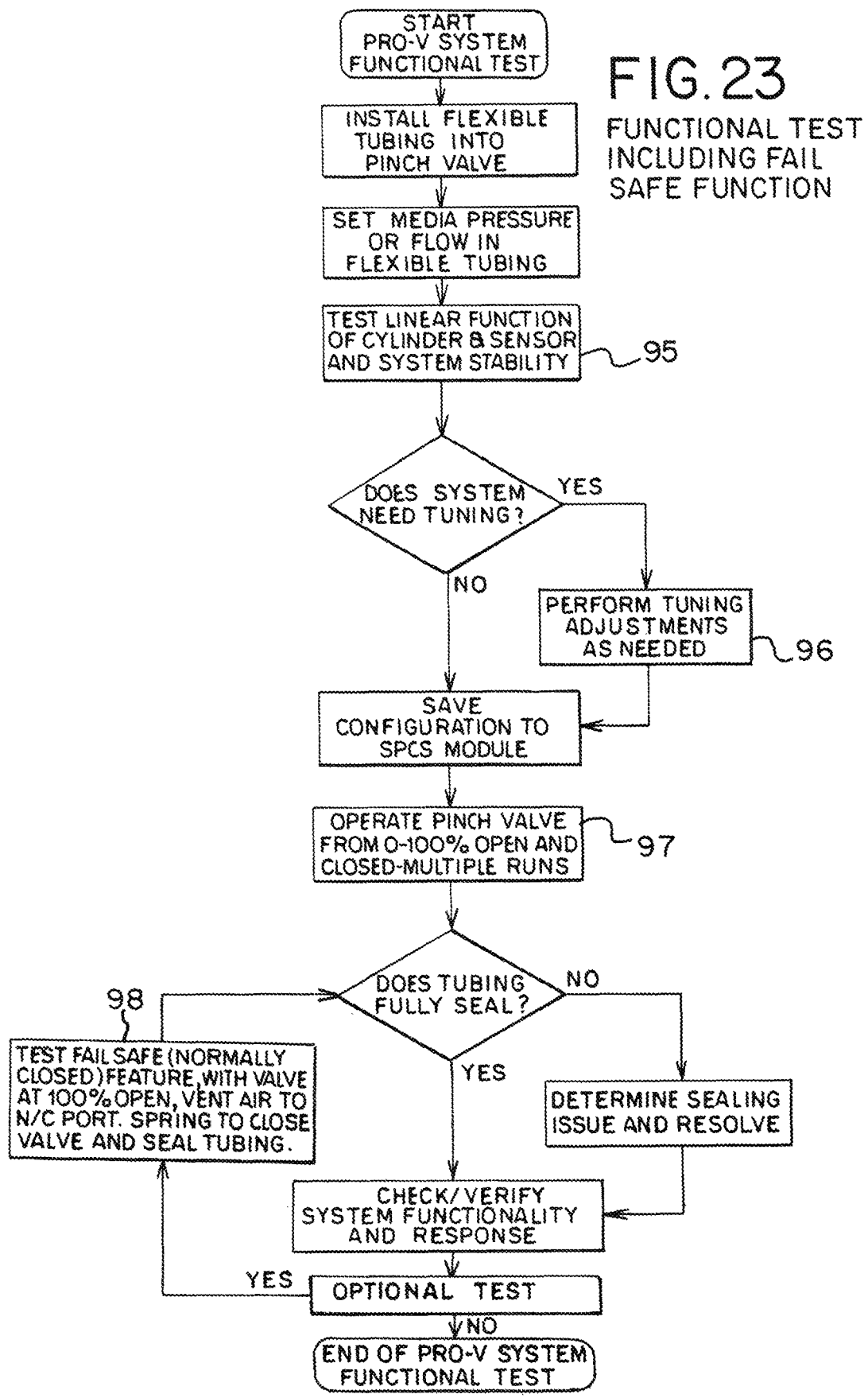

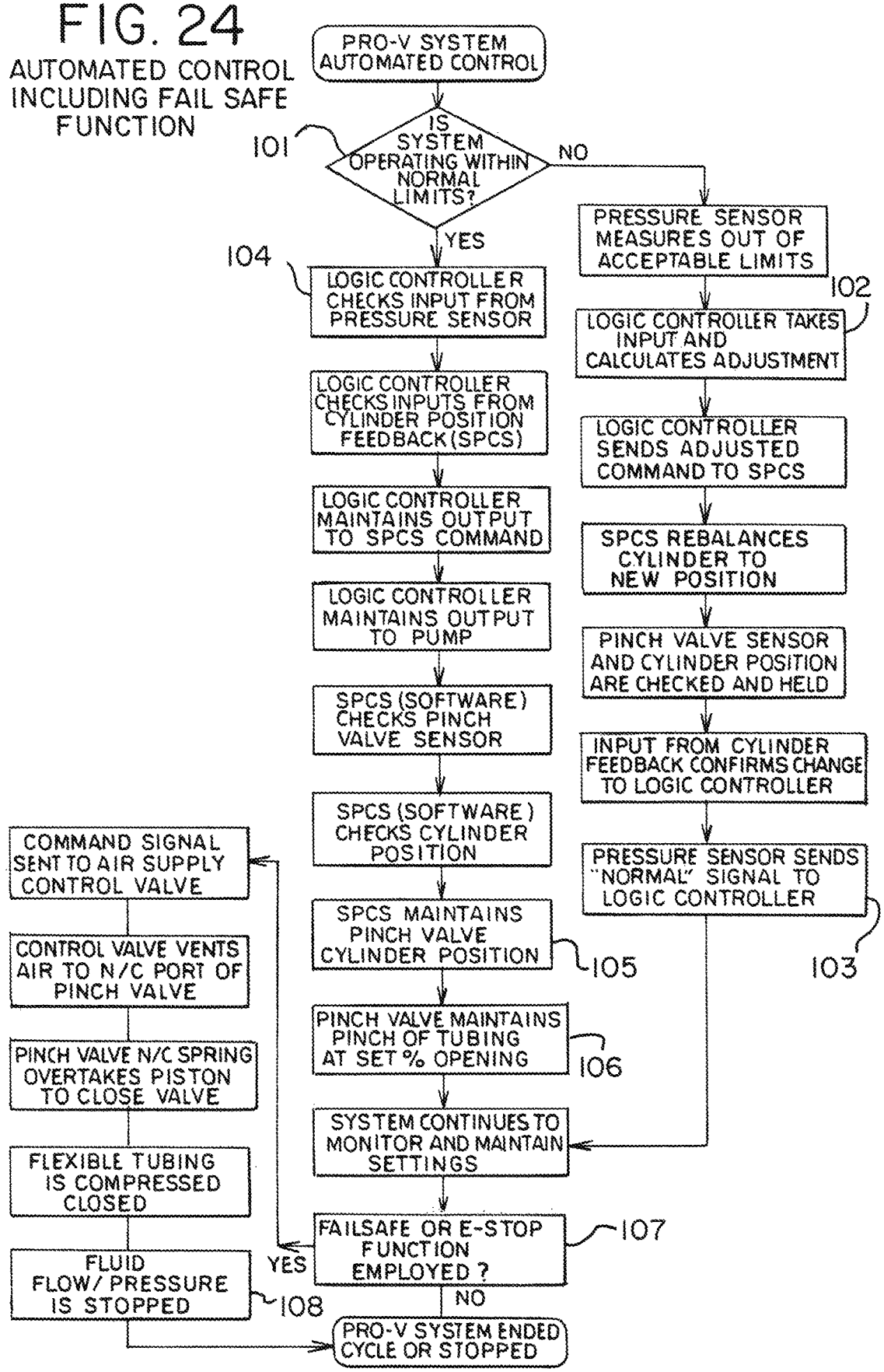

PROPORTIONALLY CONTROLLED PINCH VALVES, SYSTEMS AND METHODS

BACKGROUND

Field of the Disclosure

The present subject matter relates to pinch valves that are capable of proportional opening and closing. More particularly, the present subject matter relates to pinch valve products, systems and methods by which pinch valve action is proportionally controlled.

Description of Related Art

Pinch valves are widely used to control flow through conduits, such as flexible tubing, where the pinch valve engages only the outside surface of the conduit and does not contact the fluid flowing through the conduit, which approach avoids potential contamination of the fluid at the valve. This can be especially important for fluids that are particularly valuable and/or susceptible to contamination or are themselves potentially contaminating to surrounding areas and/or to operators of systems employing the valves. Pinch valves can be generally categorized as being pneumatically controlled or electrically controlled, or hydraulically controlled.

Pinch valves have long been used in various fields and for various technologies where this type of valve action is desirable or required. In such fields and technologies, flexible tubing is traditionally used. Pinch valve jaws or pinchers, or pressure exerted on the tubing by other means at the pinch head, engage the flexible tubing and collapse the flexible tubing wall at the pinch valve location. Some pinch valves default to the fully open position, while others default to the fully closed position.

Many pinch valves have only two essential operative positions, fully open and fully closed, and variations are known with respect to the structure used to effect the valve closing to shut down flow through the flexible tubing and to open the pinch valve to allow full flow through the flexible tube. By contrast, certain pinch valves add features by which operative positions between fully open and fully closed can be achieved.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In some applications for certain technologies proportionality in operation is desirable, and pinch valves that can not only close fully to stop flow and open fully to allow full flow but also open or close to levels between are desirable for such applications. With the present disclosure, precision in proportional operation of pinch valves along an application-specific path of opening and/or of closing is provided in proportionally controlled pinch valves, systems and methods.

The present disclosure includes the advantageous feature that pinch valves and pinch valve controlling systems and methods can be enhanced by carefully controlling not only two primary operational positions—either fully open or fully closed—but also in-between positions as are required for an application of a user of the pinch valve. The effect on the fluid flowing through the tubing between fully open and fully closed is considered, determined and used to achieve pinch valve operation that is linear in flow change and/or linear in pressure change along the closing path and/or opening path.

In one aspect, a method and/or system is provided for a proportional control pinch valve system with a pneumatic pinch valve having a pneumatic cylinder and a pinch head that accommodates flexible tubing, the pneumatic cylinder controlling movement of the pinch head along an operational path between an open position and a closed position, a position sensor, for example an analog position sensor, that is in operative communication with the pneumatic cylinder of the pinch valve and that detects, directly or indirectly, positioning of the pinch head, a control module having a pre-set or tuned program, the control module being in operative communication with the analog or other position sensor, the pre-set or tuned program of the control module and data from the analog or other position sensor combine to control the operational path of the piston of the cylinder to be linear in flow and/or pressure throughout the operational path; and whereby the linear-in-flow and/or -pressure operational path of the pneumatic cylinder follows a curve such that the pinch head movement is proportional/predictable to the change in flow and/or pressure through the tubing at the pinch head.

In another aspect, an automated proportional control pinch valve system is provided with a pneumatic pinch valve having a pneumatic cylinder and a pinch head that accommodates flexible tubing, the pneumatic cylinder controlling movement of the pinch head along an operational path between an open position and a closed position a position sensor, for example an analog position sensor, that is in operative communication with the pneumatic cylinder of the pinch valve and that detects, directly or indirectly, positioning of the pinch head, a control module having a pre-set or tuned program, the control module being in operative communication with the analog or other position sensor, the pre-set or tuned program of the control module and data from the analog or other position sensor combine to control the operational path of the pneumatic cylinder to be linear in flow throughout the operational path a flow and/or pressure sensor that monitors flow downstream of the pinch head, a logic controller in operative communication with the flow and/or pressure sensor and with the control module, the logic controller detects deviation from the linear-in-flow and/or -pressure operational path, and if any deviation is detected conveys adjustment data to the control module, and whereby the linear-in-flow operational path of the pneumatic cylinder follows a curve such that the pinch head movement is proportional to the change in flow and/or pressure through the tubing at the pinch head.

In an additional aspect, a method and/or system is provided for a proportional control pinch valve system with a pinch valve having a pinch head that accommodates flexible tubing and movement of the pinch head is controlled along an operational path between an open position and a closed position, a position sensor that is in operative communication with the pinch valve and that detects positioning of the pinch valve control unit, a control module having a pre-set or tuned program, the control module being in operative communication with the position sensor, the program of the control module and data from the position sensor combine to control the operational path of pinch head to be linear in flow and/or pressure throughout the operational path; and whereby the linear-in-flow and/or -pressure operational path of the pinch head follows a curve such that the pinch head movement is proportional/predictable to the change in flow and/or pressure through the tubing at the pinch head.

In yet an added aspect, a method and/or system is provided for a proportional control pinch valve system with a pinch valve having a pinch head that accommodates flexible tubing and movement of the pinch head is controlled along an operational path between an open position and a closed position, a position sensor that is in operative communication with the pinch valve and that detects positioning of the pinch valve control unit, a control module having a pre-set or tuned program, the control module being in operative communication with the position sensor, the program of the control module and data from the position sensor combine to control the operational path of pinch head to be linear in flow and/or pressure throughout the operational path; and whereby the linear-in-flow and/or -pressure operational path of the pinch head follows a curve such that the pinch head movement is proportional/predictable to the change in flow and/or pressure through the tubing at the pinch head and/or system is provided. A logic controller is in operative communication with a flow and/or pressure sensor and with the control module, the logic controller detects deviation from the linear-in-flow and/or -pressure operational path, and if any deviation is detected conveys adjustment data to the control module, and whereby the linear-in-flow operational path of the pinch head follows a curve such that the pinch head movement is proportional to the change in flow and/or pressure through the tubing at the pinch head.

The present disclosure includes the advantageous feature that pinch valves having a normally closed "fail safe" feature and pinch valve controlling systems and methods can be enhanced by carefully controlling not only two primary operational positions—either fully open or fully closed—but also in-between positions as are required for an application of a user of the pinch valve. The effect on the fluid flowing through the tubing between fully open and fully closed is considered, determined and used to achieve normally closed fail safe pinch valve operation that is linear in flow change and/or linear in pressure change along the closing path and/or opening path.

In one aspect, a method and/or system is provided for a proportional control pinch valve system with a pneumatic pinch valve having a pneumatic cylinder with a normally closed "fail safe" spring and a pinch head that accommodates flexible tubing, the pneumatic cylinder controlling movement of the pinch head along an operational path between an open position and a closed position, a position sensor, for example an analog position sensor, that is in operative communication with the pneumatic cylinder of the pinch valve and that detects positioning of the pneumatic cylinder, a control module having a pre-set or tuned program, the control module being in operative communication with the position sensor, the program of the control module and data from the position sensor combine to control, directly or indirectly, the operational path of the pinch head to be linear in flow and/or pressure throughout the operational path while working against additional force created by the "fail safe" spring; and whereby the linear operational path of the pneumatic cylinder follows a curve such that the pinch head movement is proportional/predictable to the change in flow and/or pressure through the tubing at the pinch head.

In another aspect, an automated proportional control pinch valve system is provided with a pneumatic pinch valve having a pneumatic cylinder with a normally closed "fail safe" spring and a pinch head that accommodates flexible tubing, the piston of the cylinder controlling movement of the pinch head along an operational path between an open position and a closed position an a position sensor, for example an analog position sensor, that is in operative communication with the pneumatic cylinder of the pinch valve and that detects positioning of the pneumatic cylinder a control module having a pre-set or tuned program, the control module being in operative communication with the position sensor, the program of the control module and data from the position sensor combine to control the operational path of the pneumatic cylinder to be linear in flow throughout the operational path a flow and/or pressure sensor that monitors flow downstream of the pinch head, a logic controller in operative communication with the flow and/or pressure sensor and with the control module, the logic controller detects deviation from the linear-in-flow and/or -pressure operational path, and if any deviation is detected conveys adjustment data to the control module, and whereby the linear-in-flow operational path of the pneumatic cylinder follows a curve such that the pinch head movement is proportional to the change in flow and/or pressure through the tubing at the pinch head while working against additional force created by the "fail safe" spring.

In an additional aspect, a method and/or system is provided for a proportional control pinch valve system with a pinch valve with a normally closed "fail safe" spring and having a pinch head that accommodates flexible tubing and movement of the pinch head is controlled along an operational path between an open position and a closed position, a position sensor that is in operative communication with the pinch valve and that detects positioning of the pinch valve control unit, a control module having a pre-set or tuned program, the control module being in operative communication with the position sensor, the program of the control module and data from the position sensor combine to control the operational path of pinch head to be linear in flow and/or pressure throughout the operational path; and whereby the linear-in-flow and/or -pressure operational path of the pinch head follows a curve such that the pinch head movement is proportional/predictable to the change in flow and/or pressure through the tubing at the pinch head while working against additional force created by the "fail safe" spring.

In yet an added aspect, a method and/or system is provided for a proportional control pinch valve system with a pinch valve with a normally closed "fail safe" spring and having a pinch head that accommodates flexible tubing and movement of the pinch head is controlled along an operational path between an open position and a closed position, a position sensor that is in operative communication with the pinch valve and that detects positioning of the pinch valve control unit, a control module having a pre-set or tuned program, the control module being in operative communication with the position sensor, the program of the control module and data from the position sensor combine to control the operational path of pinch head to be linear in flow and/or pressure throughout the operational path; and whereby the linear-in-flow and/or -pressure operational path of the pinch head follows a curve such that the pinch head movement is proportional/predictable to the change in flow and/or pressure through the tubing at the pinch head and/or system is provided. A logic controller is in operative communication with a flow and/or pressure sensor and with the control module, the logic controller detects deviation from the linear-in-flow and/or -pressure operational path, and if any deviation is detected conveys adjustment data to the control module, and whereby the linear-in-flow operational path of the pinch head follows a curve such that the pinch head movement is proportional to the change in flow and/or pressure through the tubing at the pinch head while working against additional force created by the "fail safe" spring.

BRIEF DESCRIPTION OF THE DRAWINGS

FIG. 23 is a data flow chart illustrating functional testing for an embodiment of the system and/or method for proportionally controlling pinch valves with normally closed "fail safe" feature; and FIG. 24 is a data flow chart illustrating system automated control for an embodiment of the system and/or method for proportionally controlling pinch valves with normally closed "fail safe" feature.

DESCRIPTION OF THE ILLUSTRATED EMBODIMENTS

As required, detailed embodiments of the present invention are disclosed herein; however, it is to be understood that the disclosed embodiments are merely exemplary of certain features, which may be embodied in various forms and combinations. For example, some of the various components that are illustrated as being separate pieces external of other components are not to be limited as such, it being understood some, most or all of the separate pieces can be engineered to be included as a unit of components internal to the product, which unit has or units have multiple functional elements and still be in accordance with the present disclosure. Therefore, specific details disclosed herein are not to be interpreted as limiting, but merely as a basis for the claims and as a representative basis for teaching one skilled in the art to variously employ the present invention in virtually any appropriate manner.

Figure 1:
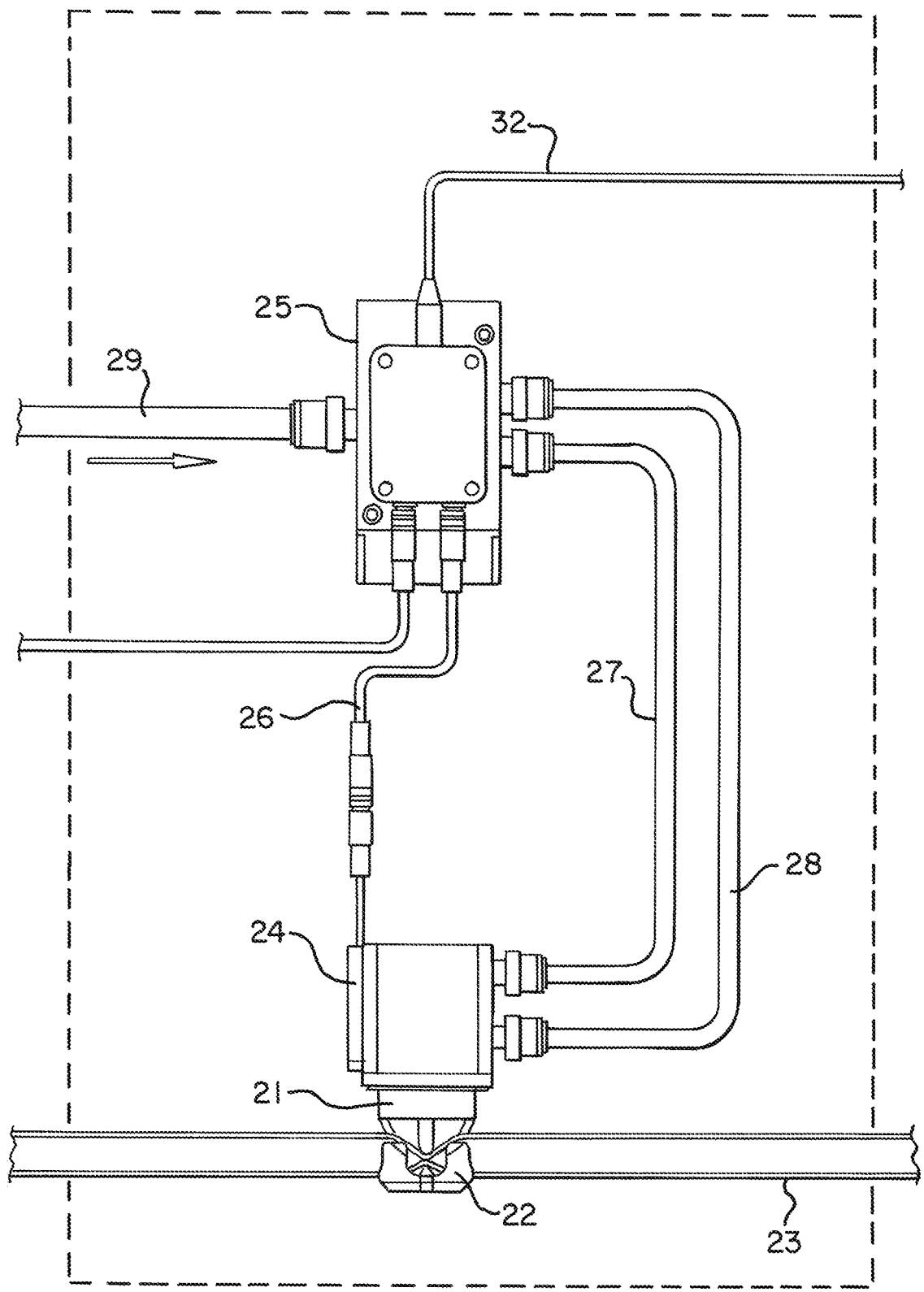
FIG. 1 is a diagrammatic view of an exemplary embodiment system and/or method for proportionally controlling pinch valves.

FIG. 1 shows an exemplary system and/or method for air and fluid control of the proportionally controlled pinch valves of the present disclosure. This is considered herein as a first-level grouping and includes a pinch valve device or component 21. Different types of pinch valve operations can be considered. The illustrated pinch valve device is equipped with a pneumatic cylinder, and can be considered to be a pneumatic pinch valve. The pinch valve 21 has a pinch head 22 that accommodates a length of tubing 23, which has flexibility so as to be compressed by the pinch head in moving from a fully open position of the tubing to a fully closed position of the tubing and positions in between. By operation of the system and method, the pinch head is controlled in accordance with other components of this disclosure for movement along an operational path between an open position and a closed position, which operational path is tailored to fit specific needs of a user application.

The pinch valve device further contains, or is in operative communication with, a position sensor 24. Depending somewhat on the type of pinch valve device utilized, the position sensor can be of different types. Analog position sensors typically provide a smooth and continuous output, which adds operational advantages. Another type of position sensor is of the digital type, which can typically output discrete steps such as, but also can be used to output many small, incremental discrete steps to approximate a smooth output achievable by using a typical analog type. Other sensor types such as of an ultrasonic or optical type fall into the category of types of sensors that detect change according to different mechanisms. For example, a magnetic sensor can be especially suitable for a pneumatic pinch valve, and an optical encoder can be especially suitable for an electric pinch valve.

For example, for some pneumatic pinch valves, a linear magnetic sensor is useful in that same is responsive to a magnetic component of the pinch valve device. For a pneumatic pinch valve device or component incorporating a magnet in its operational details, a magnetic type of operation of its piston and its cylinder, a linear magnetic sensor in close positioning with respect to the magnetic component of the pinch valve device detects and monitors movement of the magnetic component, which is used to detect pinch head positioning and degree of opening or closure of the flexible tubing within the pinch head.

Also illustrated in FIG. 1 is a control module 25. As shown, the control module is in operative communication with the sensor 24 via a sensor feedback cable 26 to provide data signal input to the control module. Also as shown, the control module is in operative communication with the pinch valve component or device by which operational signals are relayed to the pinch valve component or device in order to operate same in accordance with a pre-set or "tuned" operational path to achieve the desired function in accordance with the present disclosure. FIG. 1 illustrates an external form of this operative communication, which is in the form of control lines 27, 28; with a pneumatic pinch valve component or device, these control lines take the form of air lines for operation of the pinch valve device according to features of the present disclosure. This specific illustrated embodiment further shows a pressurized air supply line 29 into the control module, thereby providing the pneumatic fluid that is pointedly directed by the control module for operation of the pinch valve device. Data can flow between the control module 25 and a user interface 31 (see FIG. 2) via a communication cable 32, same being in accordance with the external configuration shown in FIG. 1 and FIG. 2, it being understood that these components can be consolidated into a single internal unit, or multiple units.

Concerning the user interface 31 this provides operator access to the control module when desired. Typically, the user interface is provided for system set up and for manual operation should that be required. This user interface, a power source 33 such as a typical DC power source, and a device 34 for providing a manual input command signaling to the control module 25 can be considered to comprise the power and control portion of the system illustrated in FIG. 2, referenced here as a second-level grouping.

Figure 2:
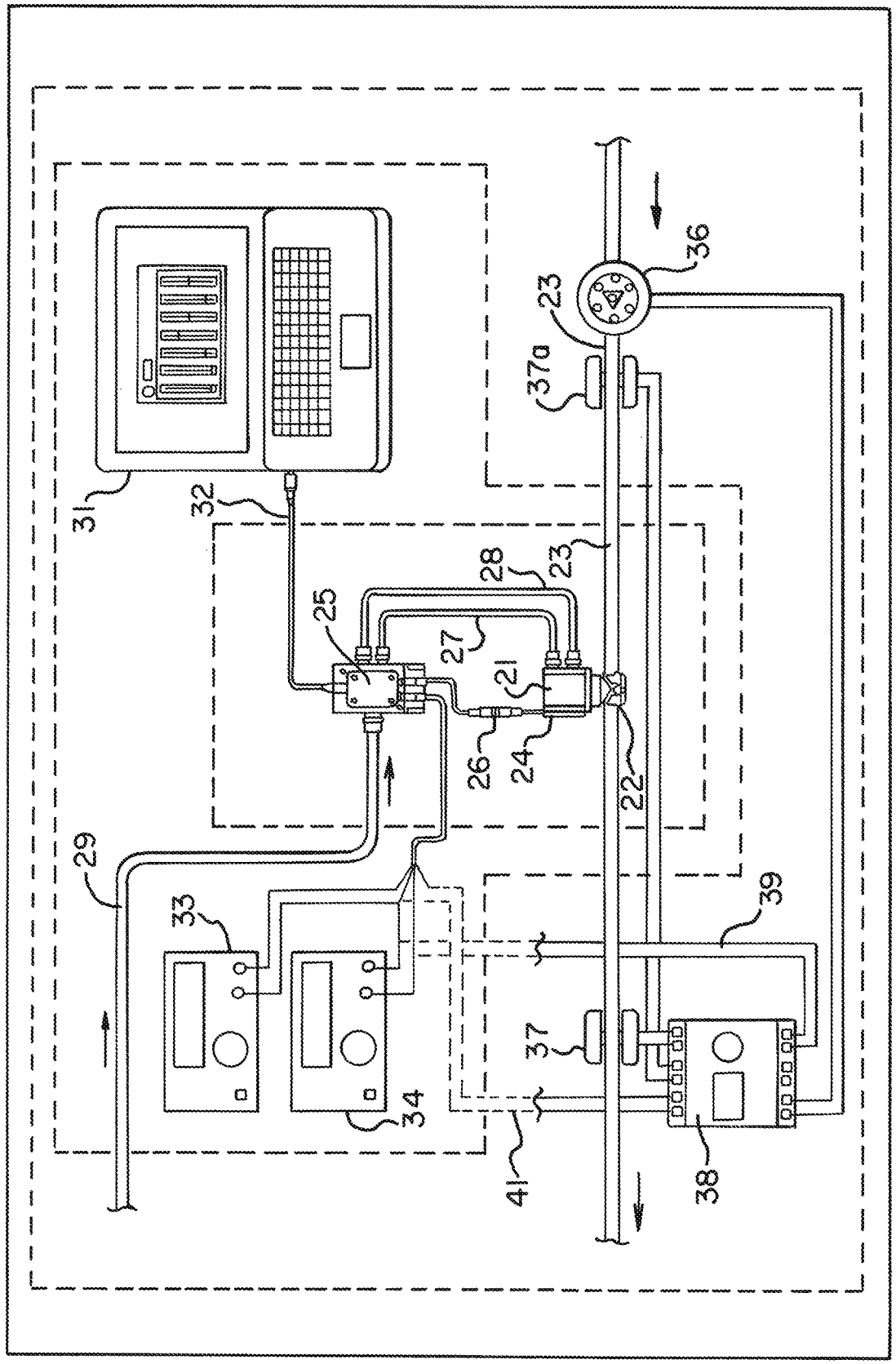
FIG. 2 is a diagrammatic view that illustrates another embodiment that follows certain aspects of FIG. 1 and illustrates further features particularly directed to automation enhancement.
Figure 3:
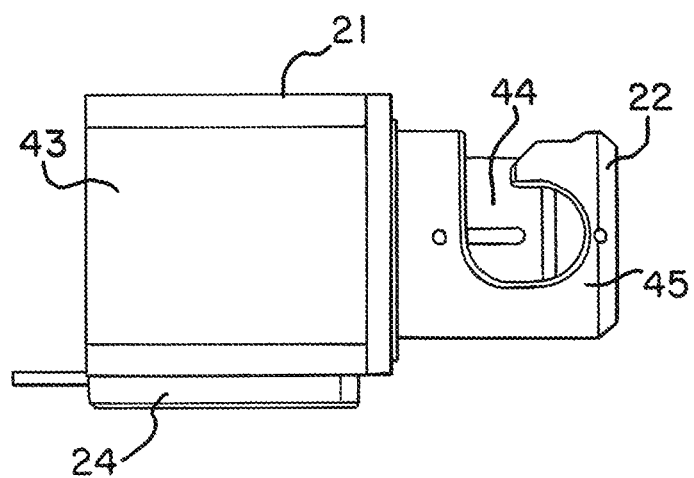
FIG. 3 is a side elevational view of an embodiment of a pinch valve device suitable for use in connection with the present disclosure.
Figure 4:
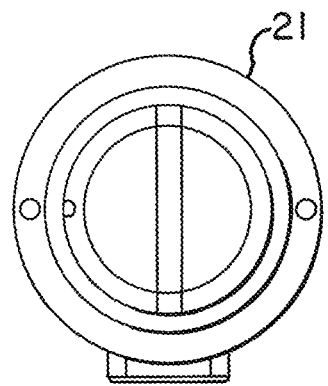
FIG. 4 is an end elevational view of the pinch valve device that is illustrated in FIG. 3.

A third-level grouping also is shown in FIG. 2. This can be considered to enhance automation of the proportional pinch valve or proportionally controlled pinch valve system. A fluid expressing member 36 is shown and provides the means for moving the fluid to the pinch head. This can take various forms, such as a positive displacement pump, a peristaltic movement device, and a pressure imparting device. This member 36 creates pressure and flow to and through the conduit or length of flexible tubing 23 including to the pinch head and beyond, as controlled by the degree of opening at the pinch head 22.

Also shown in FIG. 2 is a sensor 37 that monitors a parameter of the fluid within the tubing downstream of the pinch head. Further shown is a sensor 37a positioned upstream of the pinch head. This sensor can be considered as optional, depending on the type of data from the flexible tubing that is desired to be transmitted to the logic controller 38. A typical function of sensor 37a is to monitor the pressure and/or flow through the flexible tubing 23. The types of sensors suitable for this monitoring function include pressure sensors and/or flow sensors. Data monitored by the sensor 37 is transmitted and used to input signals to the pinch valve or pinch valve system. The members illustrated in FIG. 2 provide examples of how to achieve this function; they include a logic controller 38 for transferring data input from the sensor to the control module 25, such as through an input command signal line 39, which data can be used to effect adjustments to operation of the pinch head when conditions warrant. A pinch head position feedback loop 41 can also be included to add input to the logic controller 38 from the pinch head (or pinch head position controller such as a pneumatic cylinder in a pneumatic pinch valve arrangement). It will be appreciated that the actual members used to carry out these functions are not limited to the examples of members illustrated in FIG. 2.

Further details of the illustrated pinch valve component 21, pinch head 22 and position sensor 24 are illustrated in FIG. 3, FIG. 4 FIG. 5 and FIG. 6, each being an example of the types of components suitable for use. The particular illustrated pinch valve component is of the pneumatic type and includes a pneumatic cylinder 43 that, in the illustrated embodiment, has a piston that controls operation a moving pinch head 44 in accordance with principles and incorporating structures that will be appreciated by those in this industry. The conduit or tubing is accommodated by a pinch gap 45 and is engaged by the moving pinch head to adjust cross-sectional area of the flexible tubing at the pinch head and thus adjust the size of flow area available to the fluid within the flexible tubing.

Figure 5:
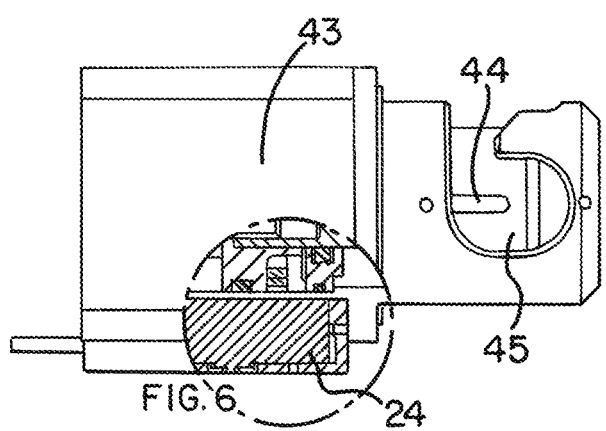
FIG. 5 is a side elevational view, partially in cross-section, illustrating further details of the embodiment of pinch valve device shown in FIGS. 3 and 4.
Figure 6:
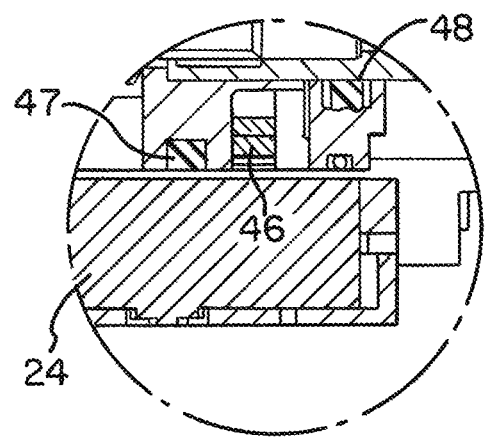
FIG. 6 is a detail cross-sectional view of the corresponding portion of the pinch valve device that is sectioned in FIG. 5.

The position sensor 24 that is shown in FIG. 5 and FIG. 6 is of the linear magnetic type. In this embodiment, the current position of a magnetic component 46 is sensed by the position sensor to read the linear movement of the pneumatic cylinder; in effect, this detects the exact current position of the moving pinch head and thus the degree of "pinch" imparted to the flexible tubing within the pinch gap. When the pinch valve component is an electric version, the sensor or encoder reads motor revolutions of a typical electric version that is a rotary device so as to monitor current extent of pinch action imparted by the pinch head onto the flexible tubing.

FIG. 5 and FIG. 6 further show dynamic seals 47, 48 that impart especially low friction at the illustrated locations. These low-friction dynamic seals 47, 48 enhance responsiveness of operation to facilitate the fine tuning of pinch head movement that is accomplished according to the present disclosure. Examples of suitable dynamic seals are low-friction "X-rings", so called because of their generally "X" profile creating a seal more suitable for the present purposes, structural details of which will be appreciated by one skilled in the art. Other low-friction rings or O-rings can be utilized.

Figure 7:
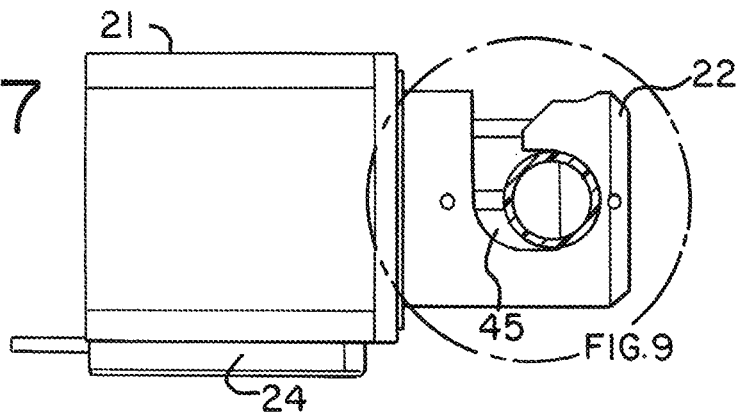
FIG. 7 is a side elevational view of an embodiment of a pinch valve device illustrating positioning of a flexible tube within the pinching location of the pinch valve device.
Figure 8:
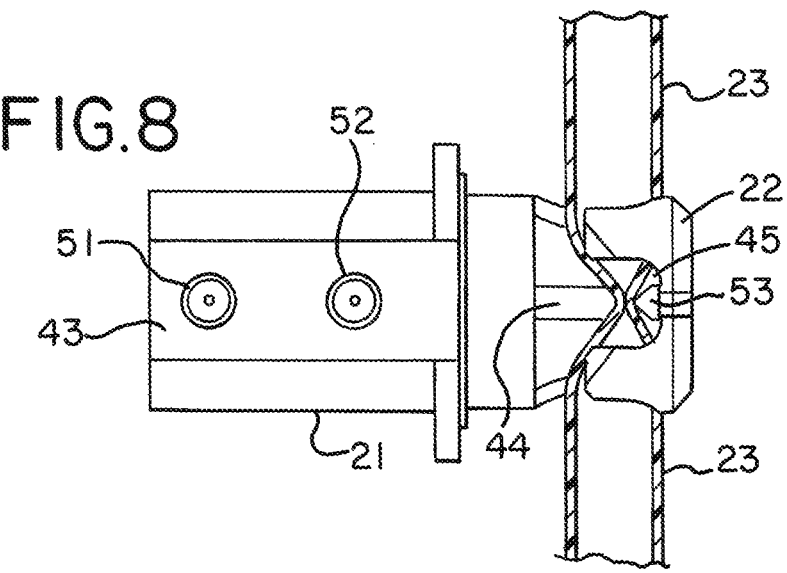
FIG. 8 is a top plan view of the pinch valve device of FIG. 7 illustrating its fully closed position at which the flexible tubing is compressed or collapsed to the fully closed position.

Particulars of a typical pneumatic pinch valve component are shown in FIG. 7 and FIG. 8. A normally open air supply port 51 and a normally closed air supply port 52 are shown, and their function and structure with respect to the pneumatic cylinder will be appreciated by the skilled artisan. The pinching location 53 shown in FIG. 8 provides a pinching geometry that provides low pinching contact areas on both sides of the flexible tubing within the pinch gap 45.

Figure 9:
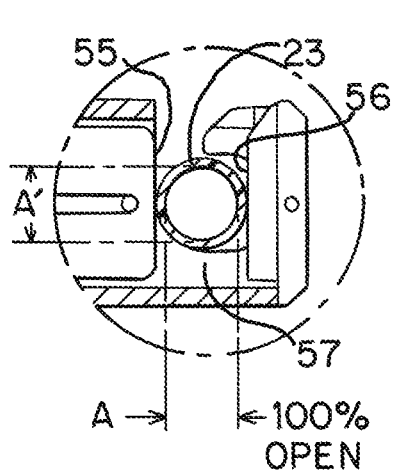
FIG. 9 is a cross-sectional view of an embodiment of a pinch head of a pinch valve device, with flexible tubing positioned therein at the 100% open, or fully open, condition.
Figure 10:
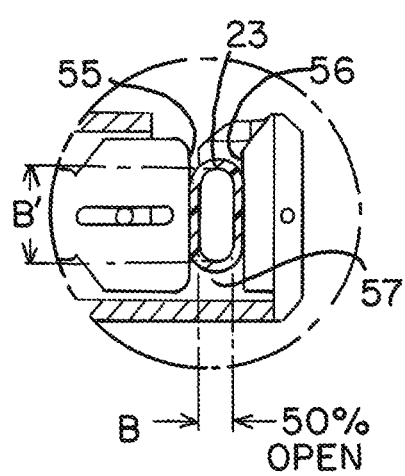
FIG. 10 is a cross-sectional view according to FIG. 9, showing the pinch head positioned to achieve a 50% open condition of the flexible tubing.
Figure 11:
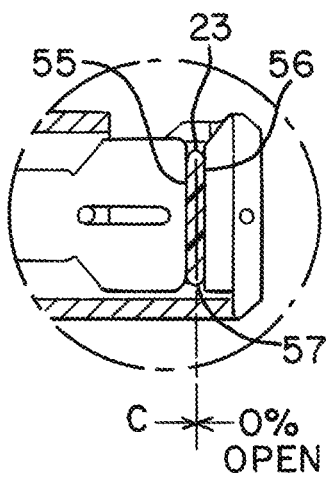
FIG. 11 is a cross-sectional view according to FIG. 9, showing the pinch head positioned to achieve a 0% open, or fully closed, condition of the flexible tubing.

Certain details of pinch head action are illustrated in FIG. 9, FIG. 10 and FIG. 11. At the 100% open pinch head position of FIG. 9, the amount of compression imparted to the flexible tubing 23 by the opposing pinch head surfaces 55, 56 of this embodiment is such that the tubing at the pinch gap 57 is 0% closed, and the axial distance inside the tubing at the pinch point is value "A". At the 50% open pinch head position of FIG. 10, the amount of compression imparted to the flexible tubing 23 by the opposing pinch head surfaces is such that the tubing at the pinch gap 57 is 50% closed, and the axial distance inside the tubing at the pinch point is value "B". At the 0% open pinch head position of FIG. 11, the amount of compression imparted to the flexible tubing 23 by the opposing pinch head surfaces is such that the tubing at the pinch gap 57 is 100% closed, and the axial distance inside the tubing at the pinch point is value "C". At this FIG. 11 position, the tubing itself is compressed, and the distance between pinch head surfaces 55 and 56 is less than twice the tubing thickness, which ensures a firm seal of the tubing to stop all flow at the pressure imparted to the fluid within the flexible tubing by the fluid expressing member.

These drawings illustrate the flexible tubing differences as the pinch head moves, for example to close the fluid path and stop fluid flow through the tubing. The percentage opened is determined by the axial distance (A, B or C) inside the tubing at the pinch point. It will be noted, as the axial distance decreases, the shape of the flexible tubing at the pinch point flattens from a circular cross-section to an oval-type of shape at the 50% open position. While the distance at the 100% open position along a line perpendicular to the axial distance (hereinafter perpendicular distance) A' in FIG. 9 is the same as axial distance "A", the perpendicular distance B' in FIG. 10 is significantly greater than axial distance B. This indicates the open area within which B and B' lie is not 50% of the open area within which A and A' lie. As illustrated herein, having the tubing at half of its internal diameter does not equate to a flow through the pinch point that is 50% of the flow through the 100% open position. In addition, having the tubing at half of its internal diameter does not equate to a pressure through the flexible tubing that is 50% of the pressure through the tubing at the 100% open position.

Figure 12:
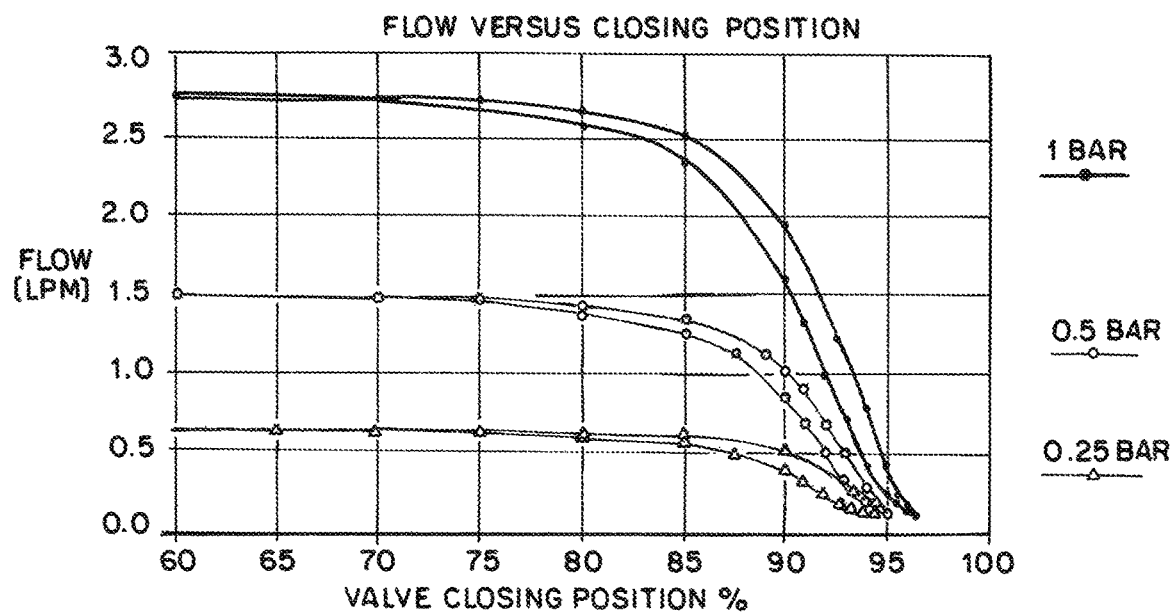
FIG. 12 is a data plot of flow through flexible tubing versus closing position of a pinch valve device of the type illustrated herein.

FIG. 12 plots the results of testing at which the closing position of a pinch head was varied from 0% closed (or 100% open as in FIG. 9), to 100% closed (0% open as in FIG. 11, with readings having been taken every 5%. From 0% closed to 60% closed, the data points were "straight line" and thus are not included in FIG. 12. In this instance "straight-line" indicates no change in flow from 0% closing position to 60% closing position. More particularly, FIG. 12 plots flow (in LPM), which can be monitored by and transmitted to the control logic by operation of sensor 37a, versus % if valve closing position for under three different pressure conditions, 1 Bar (uppermost plots), 0.5 Bar and 0.25 Bar (lowermost plots). For each of the three conditions, the flow at the pinch point remained constant (within experimental error) until approximately 70% closed; thereafter, the flow was more rapidly reduced in rate as seen in FIG. 12.

With more particular reference to the plots of FIG. 12, the curves split beginning generally at about 75% closed. In each instance, the lower plot of each split curve is of test points generated when the pinch head was in closing mode, while the higher plot of each split curve is of test points generated when the pinch head was in opening mode. It is understood this difference is explained because it is easier to control a fluid when the pinch head is pushing into the flexible tubing, i.e. during the lower, closing split curve; further, it is relatively harder to control when the pinch head is pulling away from the flexible tubing, i.e. during the upper, opening split curve, when hysteresis interferes and slows down the rate of opening.

Figure 13:
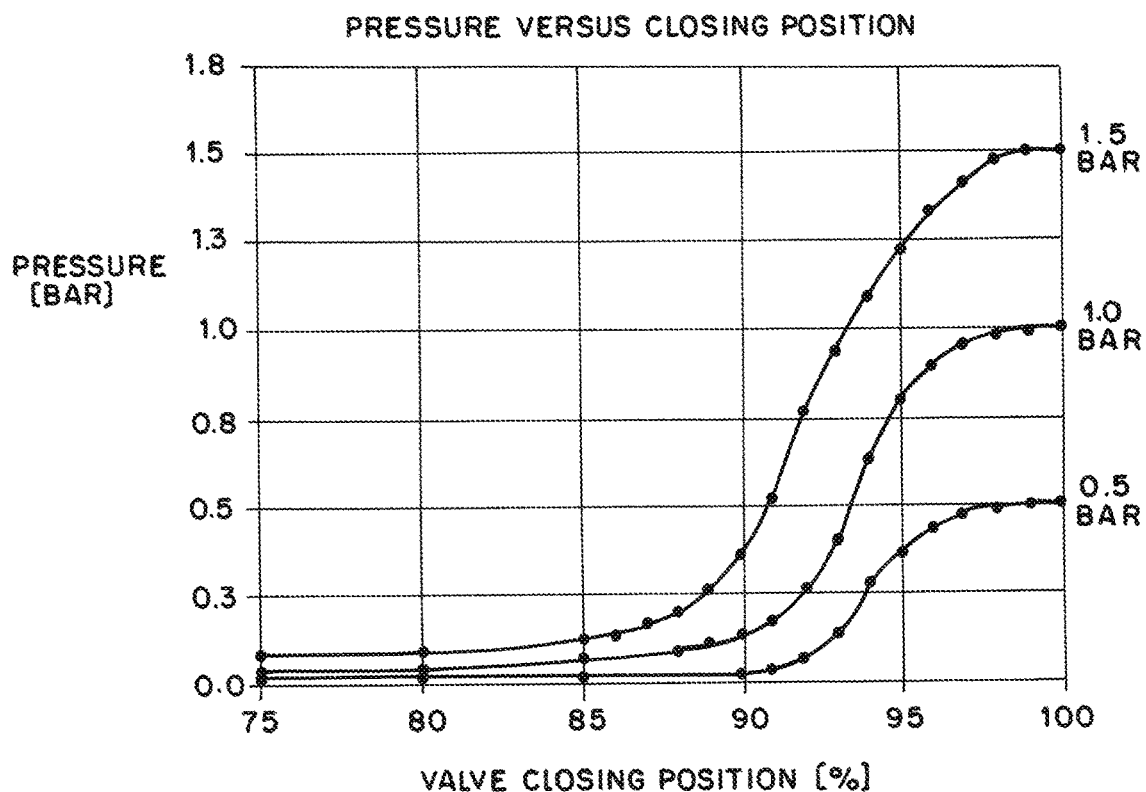
FIG. 13 is a data plot of pressure developed within flexible tubing versus closing position of a pinch valve device of the type disclosed herein.

Concerning the plots of FIG. 13, the results of testing at which the closing position of a pinch head was varied from 0% closed (or 100% open as in FIG. 9), to 100% closed (0% open as in FIG. 11, with readings having been taken every 5%. From 0% closed to 75% closed, the data points were "straight line" and thus are not included in FIG. 13. In this instance "straight-line" indicates no change in pressure upstream of the pinch point from 0% closing position to 75% closing position. FIG. 13 plots measured pressure (in Bar), which can be monitored by and transmitted to the control logic by operation of sensor 37a, versus % if valve closing position for under three different pressure conditions, 1.5 Bar (uppermost plot), 1.0 Bar and 0.5 Bar (lowermost plot). For each of the three conditions, the pressure at the pinch point—measured closely upstream of the pinch head—remained constant (within experimental error) until approximately 80% closed; thereafter, the measured pressure generally reduced in rate.

Figure 14:
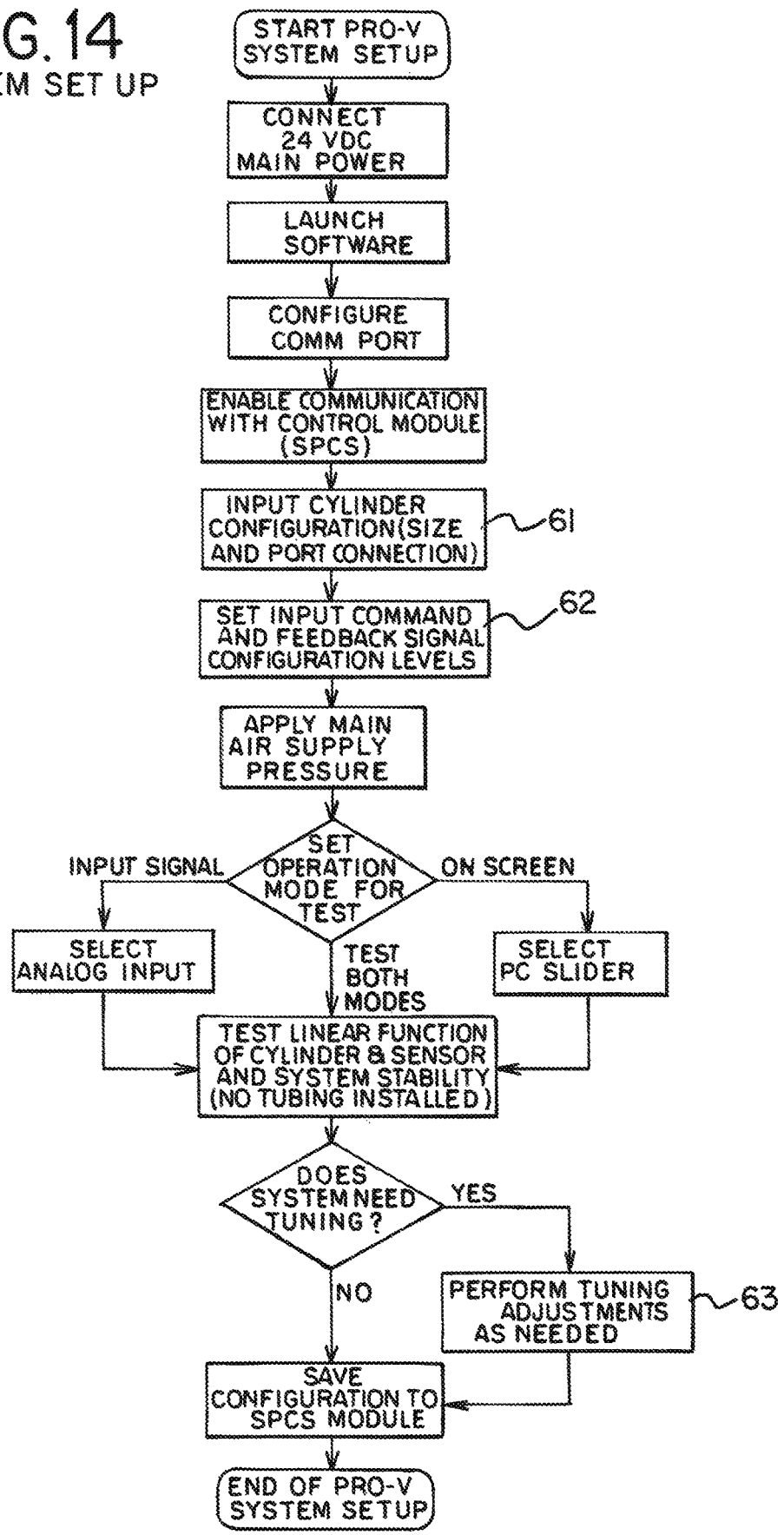
FIG. 14 is a data flow chart illustrating system setup for an embodiment of the system and/or method for proportionally controlling pinch valves.

FIG. 14 illustrates flow of data for setting up a system or pinch valve as discussed herein. This particular illustration is for a pneumatic pinch valve. After software launch and communication connection and enablement, the operator inputs cylinder configuration, including diameter size and port connection at input stage 61, typically via a user interface such as shown at 31 in FIG. 2. The operator also sets input command and feedback signal configuration levels at input stage 62. With the pneumatic air supply applied to the pinch valve and the system at its test setting, testing proceeds according to commands from the user interface to test for linear functionality of the pneumatic cylinder and the sensor and system stability, such taking place with no tubing installed. This testing determines if tuning is needed, and if needed tuning adjustments are performed at tuning stage 63, and the set-up is completed.

Figure 15:
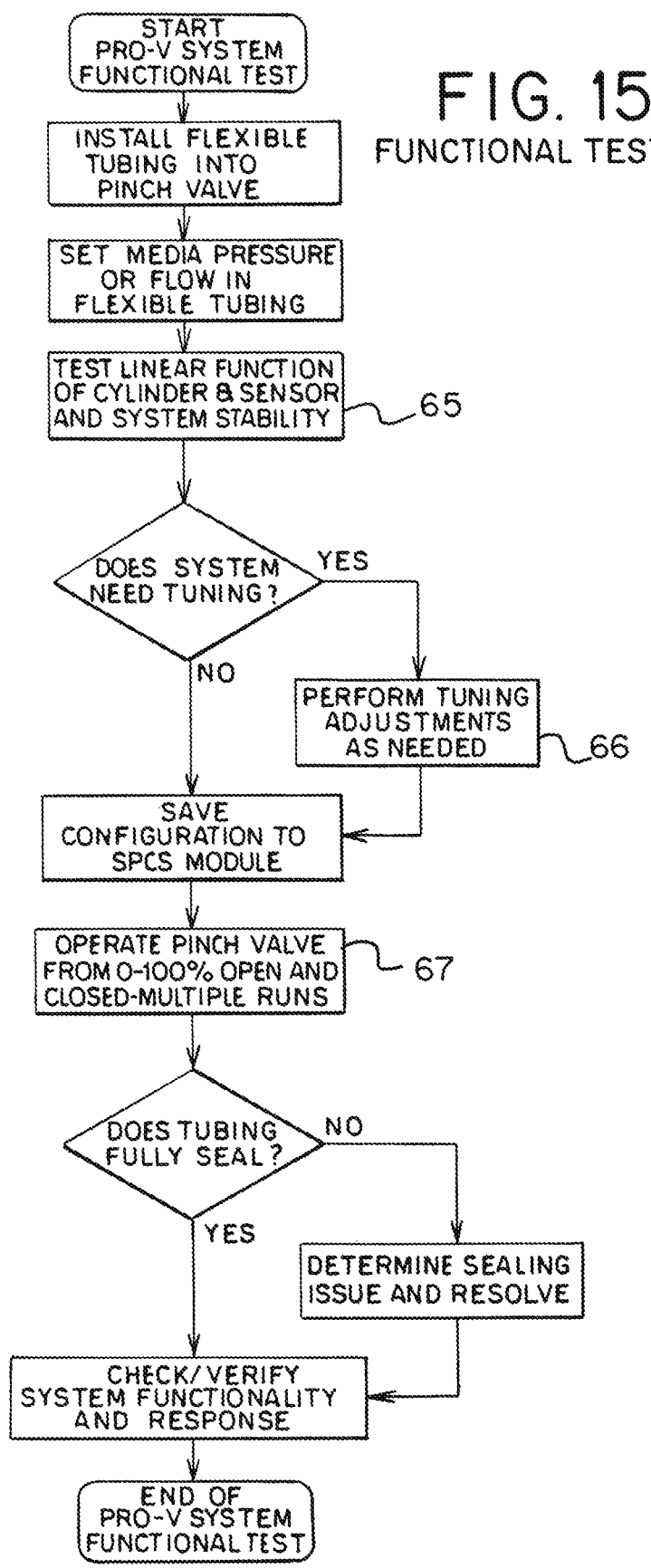
FIG. 15 is a data flow chart illustrating functional testing for an embodiment of the system and/or method for proportionally controlling pinch valves.

Once set up, functional testing also can be performed, as illustrated in FIG. 15, again for a pneumatic pinch valve. Upon installing the flexible tubing expected to be used for the particular system, media pressure or flow in the tubing is set, and testing runs for linear function of the pneumatic cylinder and sensor and system stability proceeds as at stage 65. Queries are made if system tuning is needed (e.g. does the pinch valve chatter), and tuning adjustments are performed as needed at tuning stage 66. At runs stage 67, the pinch valve is operated from 0% open to 100% open and closed for multiple runs. Sealing is checked, and the functional testing is completed, checked and verified for system functionality.

Figure 16:
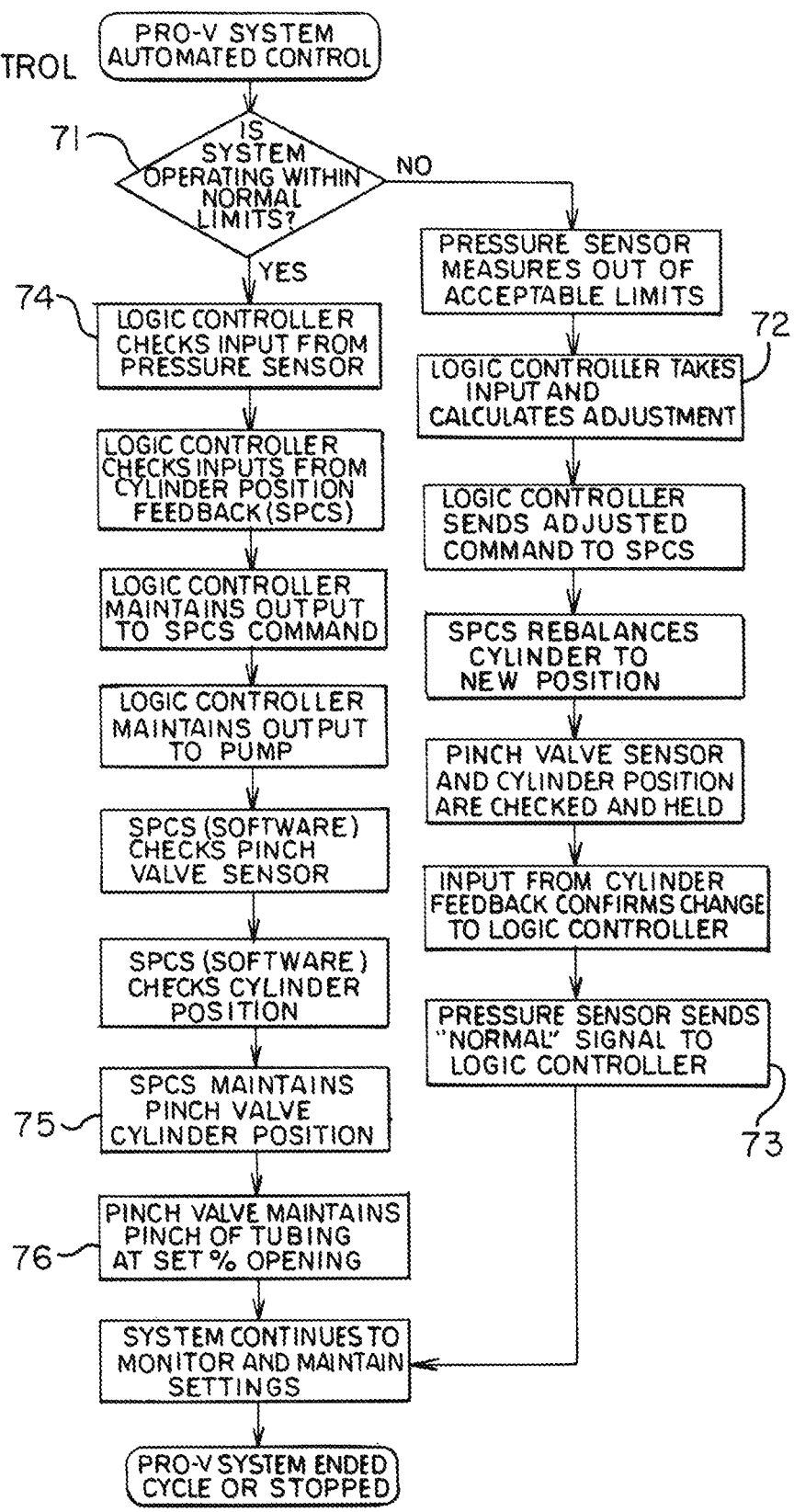
FIG. 16 is a data flow chart illustrating system automated control for an embodiment of the system and/or method for proportionally controlling pinch valves.

An example of automated control data flow for the pinch valve is summarized in FIG. 16. Normal limits expected for the specific use of the pinch valve typically include parameters such as an operating pressure range and/or maximum pressure and/or flow rate or flow rate range, tubing size and tubing type. Queries are made at stage 71. If deviations are recognized, the logic controller calculates needed adjustment to be within the normal limits, illustrated ad adjustment stage 72, and sends the adjusted command to the control module (or SPCS), and the SPCS rebalances the cylinder to the new position, followed by checking the pneumatic cylinder position to be in accordance with the adjustment. The pressure sensor then sends a "normal" signal to the logic controller 38 at signal stage 73.

With the system operating within normal limits, logic controller 38 checks input from the pressure sensor at check stage 74. Then the logic controller 38 maintains output to the specifications command, maintains output to the fluid expressing member, and the software of the control module 25 checks the pinch valve sensor and the pneumatic cylinder position and maintains the pinch valve cylinder position at stage 75. At set stage 76, the pinch valve maintains the pinch of the flexible tubing at the set opening % for the system at that stage of operation.

For purposes of disclosure, suitable pinch valve components are available from Bimba/Acro, such as 900 Series pneumatic pinch valves (including Model 934), a typical suitable analog magnetic position sensor component is available from SICK Sensor Intelligence, such as an MPS-032TSTP0 type, and typical suitable control module components are available from Bimba Manufacturing as Servo Pneumatic Proportional Control System control modules, such as SPCS-2 models. A typical suitable encoder includes optical kit encoders from US Digital, such as the ES Series.

In examples of the proportionally controlled pinch valve, whether a system with external components or a substantially self-contained unit, precision in proportional operation is achieved according to user needs and along an application specific path of opening and/or closing. In doing so, a pre-set or tuned program is developed and made a component of the control module 25. A pre-set or tuned program is created for specific pinch head move sequences according to parameters to be experienced during the particular application use for which the program is designed. Typical such parameters include expected maximum pressure, expected overall pressure range of operation, tubing size, tubing material, degree of tubing hardness, tubing wall thickness, and/or the viscosity of the fluid to be processed according to the user application. Parameters taken into consideration for pre-mapping development can include details of other components of the user application that are expected to interact with the proportionally controlled pinch valve. Such pre-set or tuned program reacts to inputs, including from the position sensor 24 providing pinch head position data.

Tuning of the program can be carried out, such as upon installation, if the use parameters such as maximum pressure, pressure range, tubing size, tubing material, tubing wall thickness, and/or fluid viscosities change from the parameters considered in setting up the pre-set or tuned program are not the actual parameters experienced by the user. Tuning can enhance consistency. Tuning typically includes running cycles with the pinch valve in the user application system and modifies the program to "tune out" undesired situations, such as "chattering" at the pinch valve during operation of the user system.

When in automatic mode, other inputs can be received from one or more sensors (for example 37, 37a), typically through the logic controller 38. Feedback loops, monitoring of parameters, and closed loop control can be utilized. In typical operations, the pre-set or tuned program need not change, but changes are possible as needed. Changes are implemented automatically in order to account for changes occurring during use that were not anticipated or expected. Examples of changes of this type include a sudden change (such as a spike or rapid reduction) in pressure due to a pump malfunction, or to running the user operation at a pressure above or below the expected pressure range, or running with incorrect tubing, or unexpected fluid viscosity changes occurring during the user operation. Whether by way of tuning or automated operation, changes can be made to address conditions encountered in the operation use but not expected when developing the program.

A component of achieving the precision in proportional operation is the recognition by the present disclosure of the non-linear relationship between pinch valve closing position and flow or pressure change through a flexible tubing subjected to pinch valve engagement and closing or opening movement. Such non-linear relationships are illustrated in FIG. 12 (regarding flow) and FIG. 13 (regarding pressure). As illustrated by these data, flow and pressure are virtually unchanged until the closing position is surprisingly close to complete closure. Such non-linear relationships are built into the program that follows pinch head move sequences that are required for the particular user application for which the program had been developed. Pinch head configuration parameters are preset and loaded into the control or drive module 25.

The present disclosure achieves a precise "dial in" of pressure and/or flow conditions needed at specific operation points along the particular operation use. The present disclosure determines and maps into the program precise parameter points (such as voltage levels) needed to provide the precise pinch head position that will accomplish the needed flow and/or pressure. The pre-set or tuned parameters are output from the control module (e.g. SPCS) to control movement of the pinch valve's pinch head. As an example, an operation use could specify the need at a particular point of the operation of a pressure of 52.3 psi control by the pinch valve, and the pre-set or tuned program working with the logic controller, whether a component of the proportional pinch valve or a separate component, will instruct the proportionally controlled pinch valve system to apply exactly "x" volts to change the pinch head opening to exactly the percentage of opening/closing needed to have the user system be at precisely 52.3 psi at the precise time and duration needed in carrying out the operation use. With the present disclosure, proper scaling of actuator stroke is achieved.

The present disclosure further can include setting of pinch head opening position to optimize the "full open to full closed" distance (or 0% to 100%) to account for expected tubing size of the operation use. A component of proportional control accuracy according to the present disclosure is to match the full open distance and full close distance of the pinch head to correspond to, or take into consideration, the outside diameter of the tubing. A typical pre-set or tuned program will include this feature to avoid or minimize actuator movement (and thus pinch head movement) before achieving initial tubing wall OD contact. Also, should the actual tubing OD be larger than expected, the pinch head might have been programmed to be 0% closed when in fact tubing compression has already begun due to the larger-than-expected OD of the tubing being used, throwing off the accuracy of the program due to incorrect tubing size.

Figure 17:
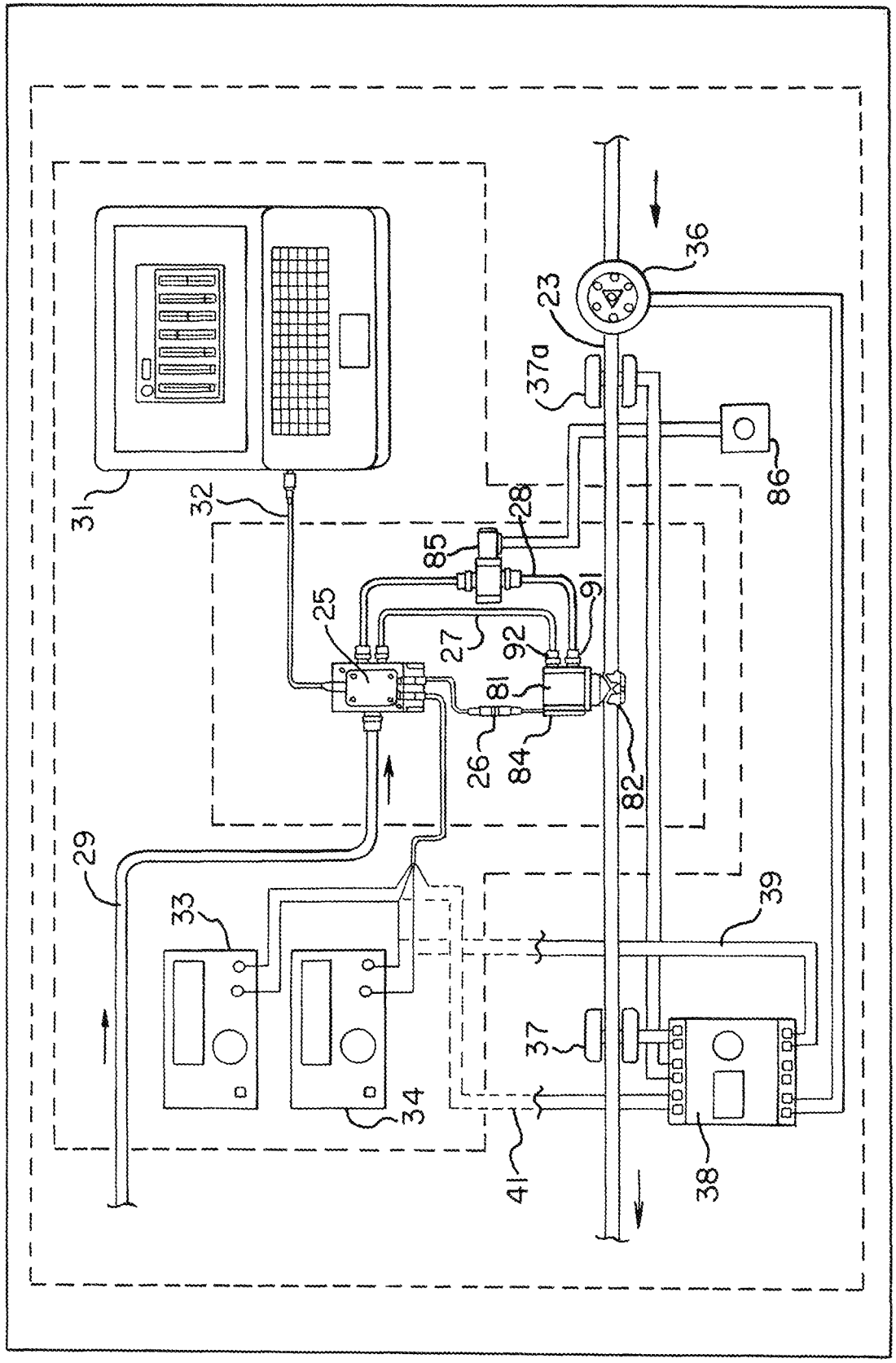
FIG. 17 is a diagrammatic view of an exemplary embodiment system and/or method for proportionally controlling pinch valves having a normally closed "fail safe" feature.

FIG. 17 shows an exemplary system and/or method for air and fluid control of the proportionally controlled pinch valves of the present disclosure with a pinch valve 81 that has a normally closed or open "fail safe" feature. Typically, the feature is of the normally closed type, which is the version discussed in detail herein. This pinch valve 81 generally follows pinch valve 21 including its variations, options and features, and like reference numbers designate similar components throughout the drawings for details other than the pinch valve. Pinch valve 81 has a pinch head 82 that accommodates a length of tubing 23, which has flexibility so as to be compressed by the pinch head in moving from a fully open position of the tubing to a fully closed position of the tubing and positions in between. By operation of the system and method, the pinch head is controlled in accordance with other components of this disclosure for movement along an operational path between an open position and a closed position, which operational path is tailored to fit specific needs of a user application, including accounting for additional force associated with the normally closed or open "fail safe" feature.

The pinch valve device 81 further contains, or is in operative communication with, a position sensor 24. Also illustrated in FIG. 17 is a control module 25, sensor 24, and sensor feedback cable 26 as previously described. FIG. 17 further illustrates control lines 27, 28 and a pressurized air supply line 29. In some embodiments, as appreciated in the art, control line 27 communicates a normally closed port 91 to the control module 25, and control line communicates a normally open port 92 to the control module. Data can flow between the control module 25 and user interface 31 via communication cable 32, it being understood that these components can be consolidated into a single internal unit, or multiple units. The fluid expressing member 36 is shown and provides the means for moving the fluid to the pinch head. Also shown in FIG. 17, the sensor 37 monitors a parameter of the fluid within the tubing downstream of the pinch head. Further shown is the sensor 37a positioned upstream of the pinch head, which may be included or omitted depending on the data to be input from the flexible tubing to the logic controller 38. A typical function of sensor 37a is to monitor the pressure and/or flow through the flexible tubing 23. Data monitored by the sensor 37 is transmitted and used to input signals to the pinch valve or pinch valve system. The members illustrated in FIG. 17 provide examples of how to achieve this function; they include the logic controller 38 for transferring data input from the sensor to the control module 25, such as through the input command signal line 39, which data can be used to effect adjustments to operation of the pinch head when conditions warrant. The pinch head position feedback loop 41 can also be included to add input to the logic controller 38 from the pinch head (or pinch head position controller such as a pneumatic cylinder in a pneumatic pinch valve arrangement).

FIG. 17 further illustrates a vent and/or control valve component 85 and a manual emergency-stop device 86 transmitting an emergency-stop command signal to the component 85. The signal transmission can be by any type of approach, including "wired" and wireless. Activation of the command signal will cause the control valve component 85 to open or release, resulting in closing of pinch valve head 82 and stop flow through the flexible tubing 23. It will be appreciated for a full system shut down additional components may be tied to the emergency stop device 86, for example shutting down the fluid expressing member 36. This can be considered a manual stop version of the system.

Figure 18:
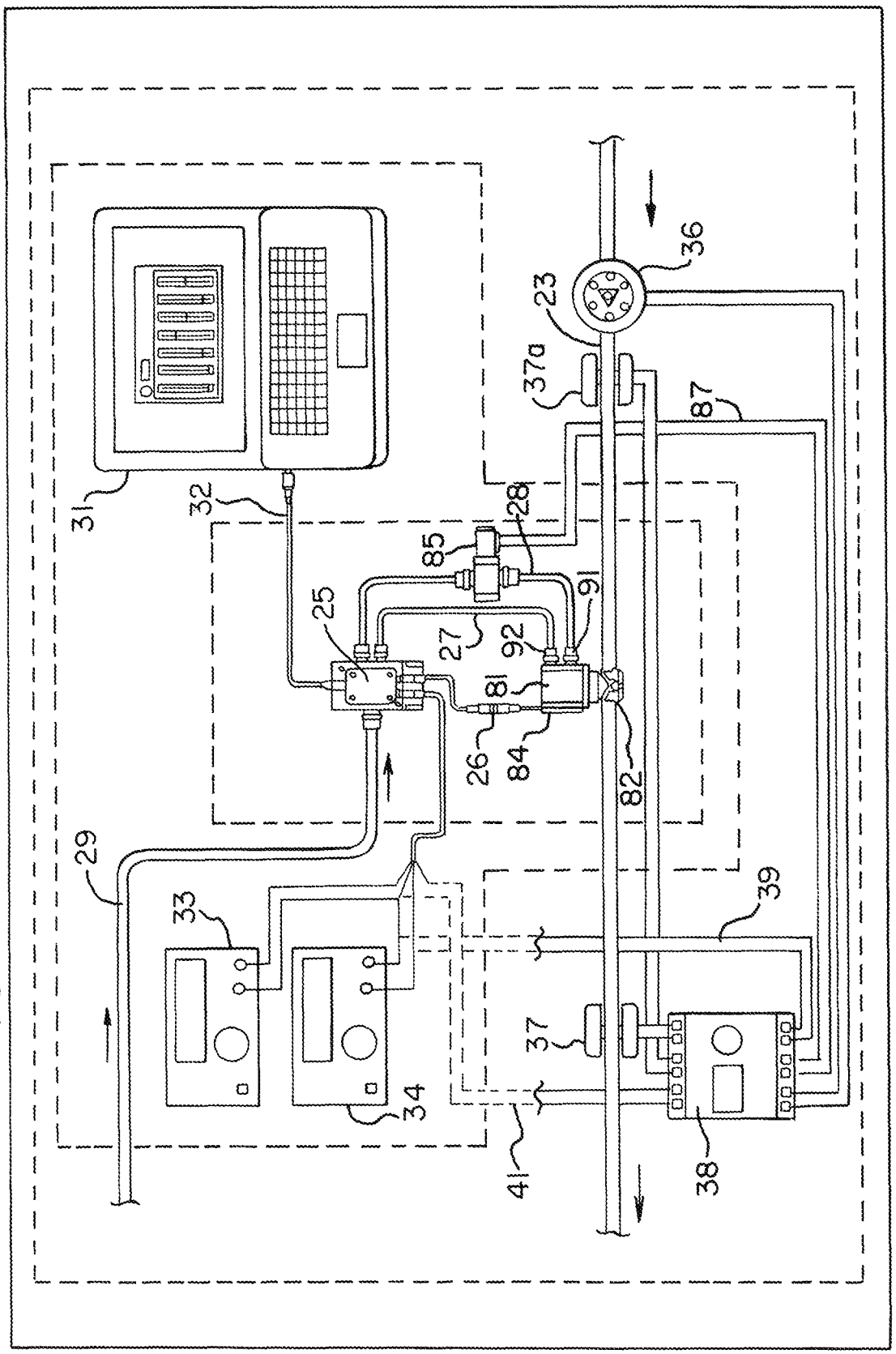
FIG. 18 is a diagrammatic view of another embodiment system and/or method for proportionally controlling pinch valves having a normally closed "fail safe" feature.

FIG. 18 illustrates an automated emergency stop system in place of, or supplementary to, the manual system shown in FIG. 17. Here a data transmission member or members 87 communicate the logic controller to 38 to the control 85 associated with the pinch valve 81. It will be appreciated wireless or other communication approaches can be utilized in place of or supplemental to the data transmission member 87. When the data input to the logic controller determines an operational aberration has occurred, a signal is given to open or release the vent and control valve 85, causing the pinch valve head 82 to close to stop flow through the flexible tubing 23. As with the manual approach of FIG. 17, this automated approach can also carry out shut down of other components of the system, including a full system shut down. Monitoring of the pressure or flow within the flexible tubing 23 is carried out by the sensor 37a, which pressure information is typically communicated to the logic controller 85.

Figure 19:
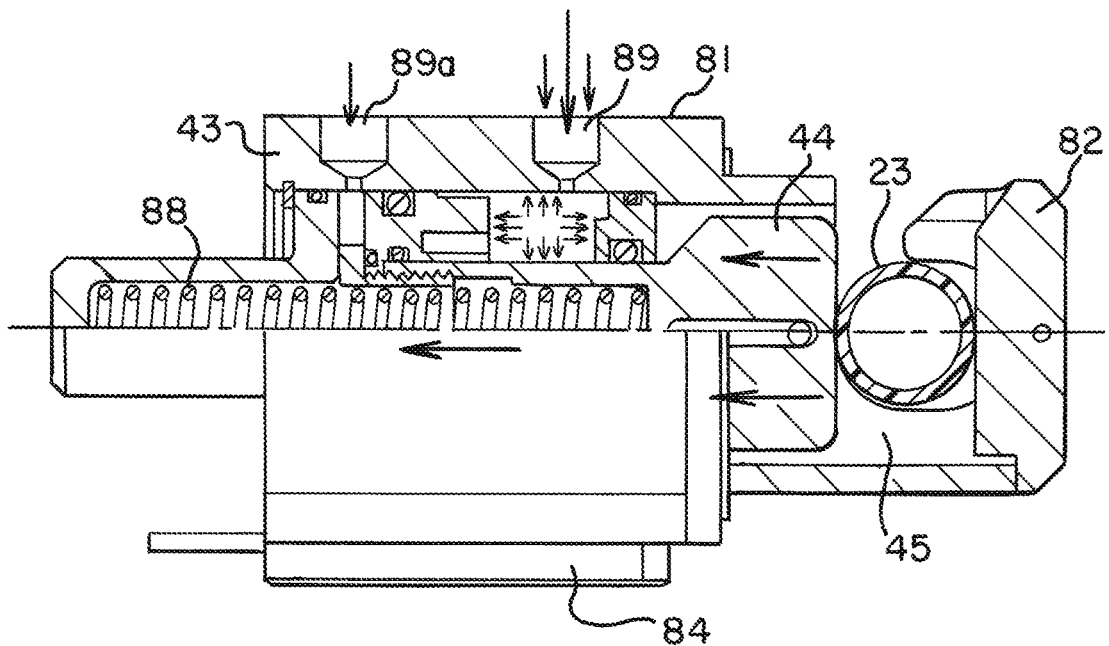
FIG. 19 is a side elevational view, partially in cross-section, illustrating details of an embodiment of a pinch valve device shown having a normally closed "fail safe" feature.

An embodiment of pinch valve device 81 included in the proportionally controlled pinch valve system of FIGS. 17 and 18 is shown in FIG. 19. Details of the illustrated pinch valve component 81 are generally in accordance with FIG. 3, FIG. 4 FIG. 5, FIG. 6, FIG. 7 and FIG. 8 and as discussed herein, each being an example of the types of components suitable for use. The particular illustrated pinch valve component is of the pneumatic type and includes a pneumatic cylinder 43 that controls operation a moving pinch head 44 in accordance with principles and incorporating structures that will be appreciated by those in this industry. The conduit or tubing 23 is accommodated by a pinch gap 45 and is engaged by the moving pinch head to adjust cross-sectional area of the flexible tubing at the pinch head and thus adjust the size of flow area available to the fluid within the flexible tubing.

Pinch valve 81 further includes a biasing member 88, such as a coil spring, that is shown in FIG. 19 in its retracted or compressed mode at which the pinch gap 45 is shown fully open. In effect, the tubing flow path is open as a result of the plunger and piston being retracted under air pressure. Such biasing as retracted or compressed in this illustrated embodiment includes maintaining fluid pressure with high pressure at as front air chamber 89 and low pressure at a rear air chamber 89a. Such pressure differential maintains biasing in the direction of horizontal arrows shown in FIG. 19.

Figure 20:
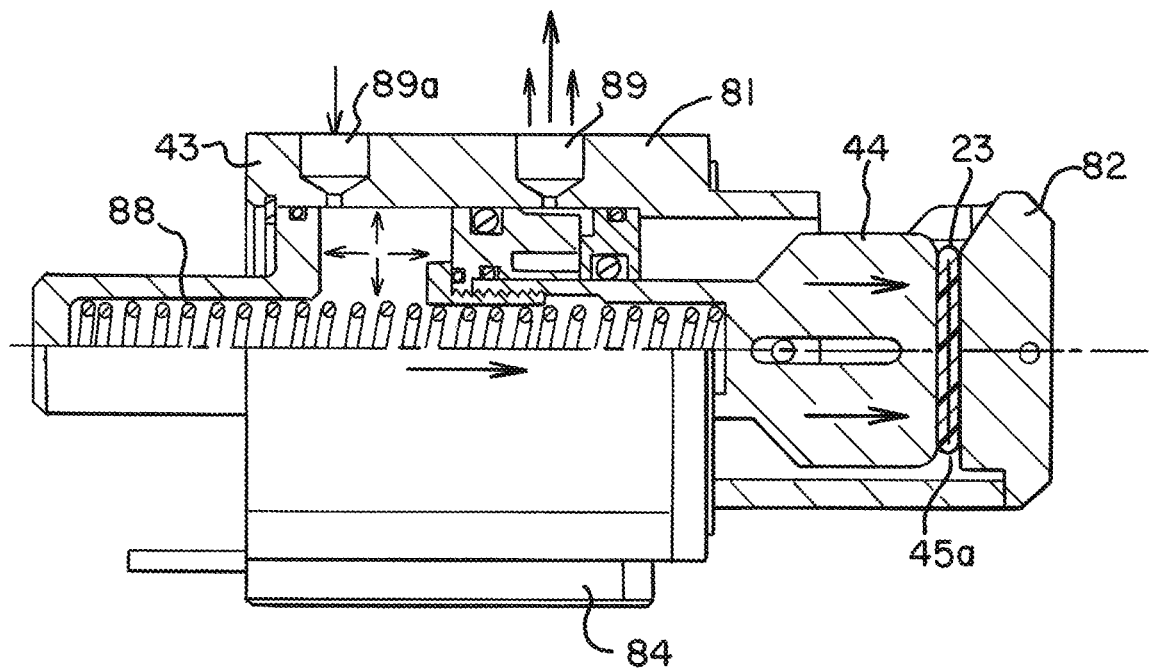
FIG. 20 is a side elevational view, partially in cross-section, illustrating the pinch valve device shown in FIG. 19 in its closed position.

FIG. 20 depicts the situation when the tubing flow path is closed as a result of the plunger and piston being extended in response to the force created when the energy of the compressed biasing member 88 is released. It will be seen tubing 23 is fully closed, and flow through the tubing is stopped, with the pinch gap 45 becoming pinch condition 45a. Such "unbiasing" action that allows movement from the fully open position of FIG. 19 to the fully closed position of FIG. 20 is initiated upon receipt of a signal by manual activation or by automated signaling from the logic controller 38 directing opening of the vent and/or control valve 85, causing venting through front air chamber 89, while the rear chamber 89a back fills, resulting in movement to the right as seen in FIG. 20. It will be appreciated that this closing is carried out according to the proportionally operational action discussed herein.

More specifically, details of pinch head action that are illustrated in FIG. 9, FIG. 10 and FIG. 11 substantially apply to the embodiment illustrated in FIGS. 19 and 20. Thus, at the 100% open pinch head position, such as in FIG. 9, the amount of compression imparted to the flexible tubing 23 by the opposing surfaces of the pinch head 44 and the pinch valve head 82 of this embodiment is such that the tubing at the pinch gap 45 is 0% closed, and the axial distance inside the tubing at the pinch point is value "A". At the 50% open pinch head position of FIG. 10, the amount of compression imparted to the flexible tubing 23 by the opposing pinch head surfaces is such that the tubing at the pinch gap 45 is 50% closed, and the axial distance inside the tubing at the pinch point is value "B". At the 0% open pinch head position of FIG. 11, the amount of compression imparted to the flexible tubing 23 by the opposing pinch head surfaces is such that the tubing at the pinch condition 45a is 100% closed, and the axial distance inside the tubing at the pinch point is value "C". At this FIG. 11 position, the tubing itself is compressed, and the distance between pinch head surfaces of pinch head 44 and pinch valve head 82 is less than twice the tubing thickness, which ensures a firm seal of the tubing to stop all flow at the pressure imparted to the fluid within the flexible tubing by the fluid expressing member. Details herein concerning the proportionality effect of the present disclosure apply similarly with respect to the system with the pinch valve devices of FIGS. 19 and 20.

Figure 21:
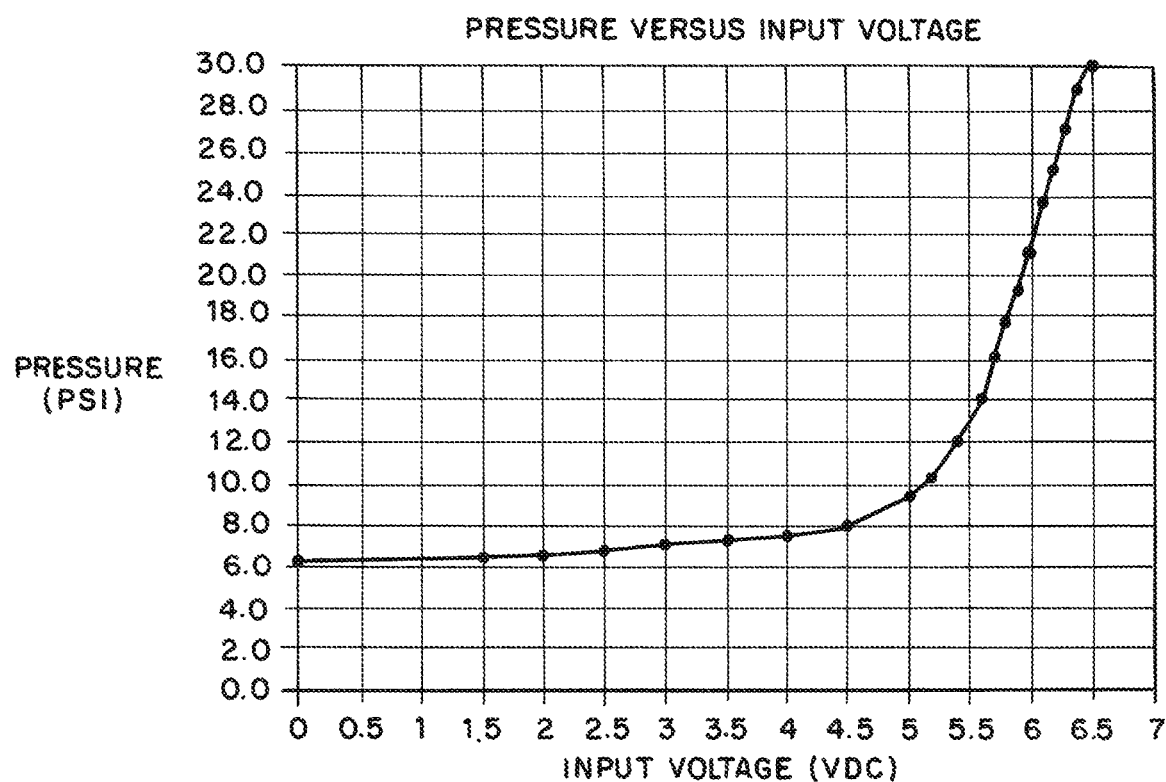
FIG. 21 is a data plot of pressure in flow through flexible tubing versus input voltage to the system as generally illustrated in FIGS. 17 and 18.

FIG. 21 plots the results of testing at which the closing position of a pinch head was varied, with readings having been taken of input voltage or "input command signal" to control module 25, varying between 1.5 volts (vdc) and 6.5 volts at 0.5 volt intervals. This voltage is the primary input to the control module, directly or through the logic controller 38, and controls valve position—greater voltage indicating greater extend of closure of the valve gap. Same is plotted against pressure from 6 psi to 30 psi the pressure in the flexible tubing 23 at the pinch point—measured closely upstream of the pinch head, for example being monitored by and transmitted to the control logic by operation of sensor 37*a*. The curve illustrates the proportional control of fluid through the tubing 23 according to this embodiment. From 0 volts to approximately 1.5 volts, the data points were substantially "straight line" and thus are not included in FIG. 21. Only a gradual increase in pressure is observed through about 4.5 volts, indicating small increments of pressure increase, while the steep plot—indicating increasing of tubing closing—begins at about 5.5 volts until maximum pressure of 30 psi in this example is achieved and flow through the flexible tubing has ceased.

Figure 22:
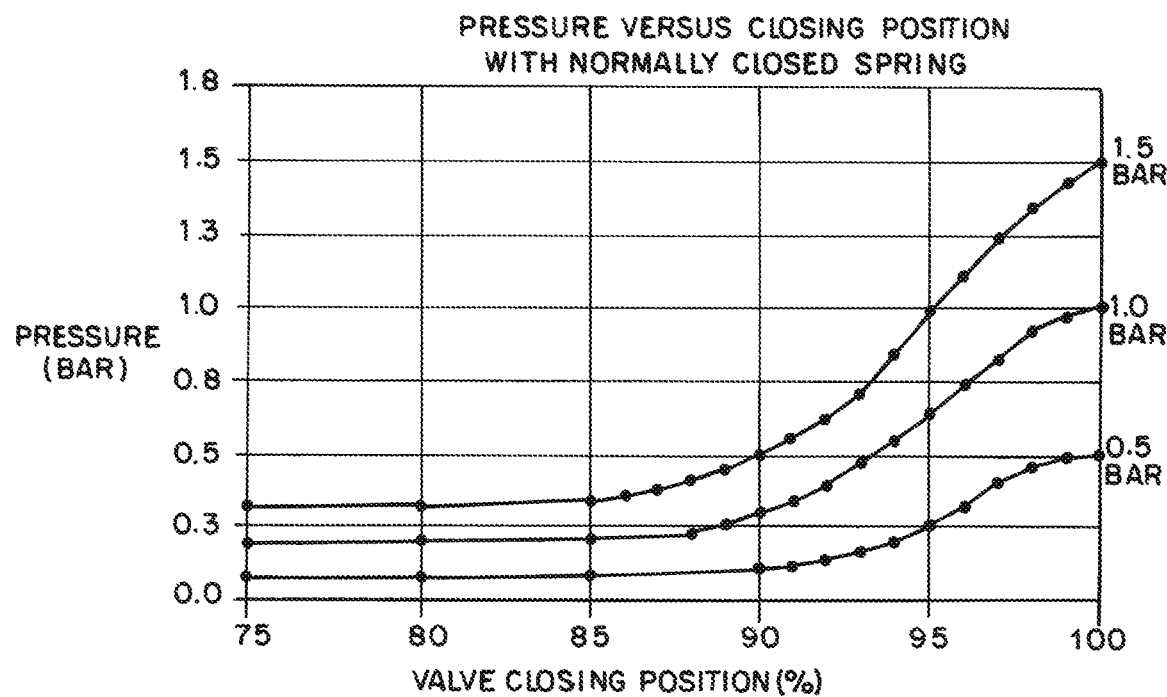
FIG. 22 is a data plot of pressure in flow through flexible tubing versus valve closing position percentage for a system as generally illustrated in FIGS. 17 and 18.

Concerning the plot of FIG. 22, the results of testing at which the closing position of a pinch head was varied from 0% closed (or 100% open as in FIG. 9), to 100% closed (0% open as in FIG. 11, with readings having been taken every 5%. From 0% closed to 75% closed, the data points were "straight line" and thus are not included in FIG. 13. In this instance "straight-line" indicates no change in pressure upstream of the pinch point from 0% closing position to 80% closing position. FIG. 22 plots measured pressure (in Bar) versus % if valve closing position for under three different pressure conditions, 1.5 Bar (uppermost plot), 1.0 Bar and 0.5 Bar (lowermost plot). For each of the three conditions, the pressure at the pinch point—measured closely upstream of the pinch head, for example being monitored by and transmitted to the control logic by operation of sensor 37*a*—remained constant (within experimental error) until approximately 85% closed; thereafter, the measured pressure generally reduced in rate. When compared with the FIG. 13 plot, the FIG. 22 curve is slightly more linear from 85% to 100%, and the pressure of increasing rate of pressure change is higher. Both comparison differences are a result of the proportional controller working against the additional force created by the biasing component 88 in this embodiment.

FIG. 23 illustrates flow of data for setting up a system or pinch valve as discussed herein. This particular illustration is for a pneumatic pinch valve and generally follows the data flow of FIG. 15, concerning functional testing. Upon installing the flexible tubing expected to be used for the particular system, media pressure or flow in the tubing is set, and testing runs for linear function of the pneumatic cylinder and sensor and system stability proceeds as at stage 95. Queries are made if system tuning is needed (e.g. does the pinch valve chatter), and timing adjustments are performed as needed at tuning stage 96. At runs stage 97, the pinch valve is operated from 0% open to 100% open and closed for multiple runs. Stage 98 indicates fail safe test, such as normally closed with valve open at 100%, air vented to close the biasing component and seal the flexible tubing. Sealing is checked, and the functional testing is completed, checked and verified for system functionality.

An example of automated control data flow for the pinch valve is summarized in FIG. 24. Normal limits expected for the specific use of the pinch valve typically include parameters such as an operating pressure range and/or maximum pressure and/or flow rate or flow rate range, tubing size and tubing type. Queries are made at stage 101. If deviations are recognized, the logic controller calculates needed adjustment to be within the normal limits, illustrated ad adjustment stage 102, and sends the adjusted command to the control module (or SPCS), and the SPCS rebalances the cylinder to the new position, followed by checking the pneumatic cylinder position to be in accordance with the adjustment. The pressure sensor then sends a "normal" signal to the logic controller 38 at signal stage 103.

With the system operating within normal limits, logic controller 38 checks input from the pressure sensor at check stage 104. Then the logic controller 38 maintains output to the specifications command, maintains output to the fluid expressing member, and the software of the control module 25 checks the pinch valve sensor and the pneumatic cylinder position and maintains the pinch valve cylinder position at stage 105. At set stage 106, the pinch valve maintains the pinch of the flexible tubing at the set opening % for the system at that stage of operation. Stage 107 queries for emergency stop or "fail-safe" function employment; if yes, the automated stages proceed until fluid flow is stopped or pressure is relieved at stage 108.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

The invention claimed is:

1. A proportional control pinch valve method, comprising:
   (a) providing a pneumatic pinch valve having a pneumatic cylinder and a pinch head that accommodates a flexible tubing, the pneumatic cylinder controlling movement of the pinch head along an operational path between an open position and a closed position, a position sensor associated with the pneumatic cylinder to detect positioning of the pneumatic cylinder, and a control module for the position sensor and having a pre-set or tuned program;
   (b) inserting a flexible tubing in the pneumatic pinch valve such that the flexible tubing moves along a path between fully open and fully closed when operated on by the pinch head;
   (c) controlling the operational path of the pneumatic cylinder by operation of the program of the control module in combination with data from the position sensor to provide linear increase or decrease in flow through or pressure at the flexible tubing; and
   (d) following a curve such that the operational path of the pneumatic cylinder results in pinch head movement that linearly increases or decreases in flow and/or pressure through the tubing at the pinch head,
   wherein the curve of the operational path is straight line for greater than half of the operational path of the pinch head, while the remainder of the operational path is curved between a full value and a zero value of flow or pressure.

2. The method of claim 1, further including providing a flow or pressure sensor along the flexible tubing upstream of the pinch head, communicating data from the sensor to the control module, detecting any deviation from proportionality, and modifying the program to correct for any such deviation.

3. A proportional control pinch valve system, comprising:
(a) a pneumatic pinch valve having a pneumatic cylinder and a pinch head that is structured to accommodate a flexible tubing when fluid flows therethrough, the pneumatic cylinder controlling movement of the pinch head along an operational path between an open position and a closed position;
(b) a position sensor that is in operative communication with the pneumatic cylinder of the pinch valve and that detects positioning of the pneumatic cylinder;
(c) a control module having a pre-set or tuned program, the control module being in operative communication with the position sensor, the program of the control module and data from the position sensor combine to control the operational path of the pneumatic cylinder to provide linear increase or decrease in flow through or pressure at the flexible tubing throughout the operational path of the pneumatic cylinder; and
(d) whereby the operational path of the pneumatic cylinder follows a curve such that the pinch head movement is proportional to the change in flow or pressure through the tubing at the pinch head,
wherein the curve of the operational path is straight line for greater than half of the operational path of the pinch head, while the remainder of the operational path is curved between a full value and a zero value of flow or pressure.

4. The proportional pinch valve system in accordance with claim 3, wherein an upstream sensor monitors flow or pressure in the flexible tubing upstream of the pinch head; and a logic controller is in operative communication with the upstream sensor and with the control module, the logic controller detects deviation from the linear operational path, and if any deviation is detected conveys adjustment data to the control module, and the program is modified in accordance with the adjustment data, if deviation is detected by the logic controller.

5. The proportional pinch valve system in accordance with claim 3, wherein the operational path achieves pinch head movement that corresponds to a linear decrease or increase in flow or pressure through the tubing at the pinch head.

6. The proportional pinch valve system in accordance with claim 3, wherein the position sensor is an analog position sensor, a digital position sensor with discrete steps output approximating analog position sensor output, or a position sensor that detects change in position compatible with the pinch valve.

7. The proportional pinch valve system in accordance with claim 3, wherein the pneumatic pinch valve has a normally closed port that opens when the system experiences a shut-down condition.

8. The proportional pinch valve system in accordance with claim 7, further including a vent-control valve in operative communication with the normally closed port of the pneumatic pinch valve, which vent-control valve vents an air supply to the pinch valve, thereby allowing the pinch valve to close in response to the shut-down condition.

9. A proportionally controlled pinch valve, comprising:
(a) a pneumatic cylinder in operative communication with a pinch head that is structured to accommodate flexible tubing when fluid flows therethrough, the pneumatic cylinder controlling movement of the pinch head along an operational path between an open position and a closed position;
(b) a position sensor that is in operative communication with the pneumatic cylinder and that detects positioning of the pneumatic cylinder;
(c) a control module having a pre-set or tuned program, the control module being in operative communication with the position sensor, the program of the control module and data from the position sensor combine to control the operational path of the pneumatic cylinder to provide linear increase or decrease in flow through the flexible tubing throughout opening or closing of the pinch valve; and
(d) whereby the operational path of the pneumatic cylinder follows a curve such that the pinch head movement is proportional to the change in flow or pressure through the tubing at the pinch head,
wherein the curve of the operational path is straight line for greater than half of the operational path of the pinch head, while the remainder of the operational path is curved between a full value and a zero value of flow or pressure.

10. The pinch valve in accordance with claim 9, further including a logic controller in operative communication with an upstream sensor that monitors flow or pressure in the flexible tubing upstream of the pinch head and with the control module, the logic controller detects deviation from the linear operational path, and if any deviation is detected conveys adjustment data to the control module, and the program is modified in accordance with the adjustment data, if deviation is detected by the logic controller.

11. The pinch valve in accordance with claim 9, wherein the operational path achieves pinch head movement that corresponds to a linear decrease or increase in flow or pressure through the tubing at the pinch head.

12. The pinch valve in accordance with claim 9, wherein the position sensor is an analog position sensor, a digital position sensor with discrete steps output approximating analog position sensor output, or a position sensor that detects change in position compatible with the pinch valve.

13. The pinch valve in accordance with claim 9, wherein the pneumatic pinch valve has a normally closed port that opens when the system experiences a shut-down condition, further including a vent-control valve in operative communication with the normally closed port of the pneumatic pinch valve, which vent-control valve vents an air supply to the pinch valve, thereby allowing the pinch valve to close in response to the shut-down condition.

14. The pinch valve in accordance with claim 9, wherein the pinch valve component includes at least one low-friction ring associated with movement of the pneumatic cylinder for operation of the pinch head.

15. A proportionally controlled pinch valve, comprising:
(a) a drive unit in operative communication with a pinch head that is structured to accommodate flexible tubing when fluid flows therethrough, the drive unit controlling movement of the pinch head along an operational path between an open position and a closed position;
(b) a position sensor that is in operative communication with the drive unit and that detects positioning of the drive unit, the position sensor being an analog position sensor, a digital position sensor with discrete steps output approximating analog position sensor output, or a position sensor that detects change in position compatible with the pinch valve;

(c) a control module having a pre-set or tuned program, the control module being in operative communication with the position sensor, the program of the control module and data from the position sensor combine to control the operational path of the drive unit to provide linear increase or decrease in flow through and/or pressure at the flexible tubing throughout opening or closing of the pinch valve; and (d) whereby the operational path of the drive unit follows a curve such that the pinch head movement is proportional to the change in flow or pressure through the tubing at the pinch head, wherein the curve of the operational path is straight line for greater than half of the operational path of the pinch head, while the remainder of the operational path is curved between a full value and a zero value of flow or pressure.

16. The pinch valve in accordance with claim 15, further including a logic controller in operative communication with a flow and/or pressure sensor that monitors flow and/or pressure in the flexible tubing downstream of the pinch valve and with the control module, the logic controller detects deviation from the linear-in-flow and/or linear-in-pressure operational path, and if any deviation is detected conveys adjustment data to the control module.

17. The pinch valve in accordance with claim 15, wherein the pinch head is associated with a normally closed port that opens when the pinch valve receives a command of a shut-down condition.

18. The pinch valve in accordance with claim 15, further including a logic controller in operative communication with a flow and/or pressure sensor that monitors flow and/or pressure in the flexible tubing upstream of the pinch valve and with the control module, the logic controller detects deviation from the linear-in-flow and/or linear-in-pressure operational path, and if any deviation is detected conveys adjustment data to the control module.

19. The pinch valve in accordance with claim 15, wherein the operational path achieves pinch head movement that corresponds to a linear decrease or increase in flow or pressure through the tubing at the pinch head.

20. The pinch valve in accordance with claim 15, wherein the pinch head is associated with a normally closed port that opens when the valve experiences a shut-down condition, further including a vent-control valve in operative communication with the normally closed port, which vent-control valve vents an air supply to the normally closed port, thereby allowing the pinch valve to close in response to the shut-down condition.

21. The pinch valve in accordance with claim 15, wherein the drive unit is one of a cylinder and an electric rotary device.

22. The pinch valve in accordance with claim 21, wherein the cylinder is a pneumatic cylinder.

* * * * *